(12) United States Patent
Hoyt et al.

(10) Patent No.: US 6,286,788 B1
(45) Date of Patent: Sep. 11, 2001

(54) ALTERNATE INTERCONNECTION HOYTETHER FAILURE RESISTANT MULTILINE TETHER

(76) Inventors: Robert P. Hoyt, 1917 NE. 143rd St., Seattle, WA (US) 98125; Robert L. Forward, 6114 Pebble Ct., Clinton, WA (US) 98236

(*) Notice: Subject to any disclaimer, the term of this patent is extended or adjusted under 35 U.S.C. 154(b) by 0 days.

(21) Appl. No.: 09/658,510

(22) Filed: Sep. 8, 2000

Related U.S. Application Data

(62) Division of application No. 09/403,033, filed as application No. PCT/US97/05840 on Apr. 22, 1997, now Pat. No. 6,173,922.

(51) Int. Cl.⁷ ..................................................... B64G 9/00
(52) U.S. Cl. ........................................ 244/172; 244/158 R
(58) Field of Search ............................ 244/1 TD, 158 R, 244/164, 172

(56) References Cited

U.S. PATENT DOCUMENTS

| | | | |
|---|---|---|---|
| 3,362,656 | * | 1/1968 | Wyatt . |
| 3,532,298 | * | 10/1970 | Swet . |
| 3,582,016 | * | 6/1971 | Sherman . |
| 4,097,010 | * | 6/1978 | Colombo et al. . |
| 4,580,747 | * | 4/1986 | Pearson . |
| 4,686,605 | * | 8/1987 | Easlund . |
| 4,824,051 | * | 4/1989 | Engelking . |
| 4,923,151 | * | 5/1990 | Roberts et al. . |
| 5,082,211 | * | 1/1992 | Werka . |
| 5,419,516 | * | 5/1995 | Leipold et al. . |
| 6,089,511 | * | 7/2000 | Rasmusson . |

* cited by examiner

Primary Examiner—Charles T. Jordan
Assistant Examiner—Tien Dinh
(74) Attorney, Agent, or Firm—Arthur M. Dula

(57) ABSTRACT

A tether having the special technical feature of multiple primary load-bearing lines and normally slack secondary lines. These primary and secondary lines are connected together with knotless, slipless interconnections so the tether maintains high strength and some of the lines can be cut without failure of the tether when it is operated near the ultimate failure load of the material from which it is constructed. This tether can safely carry load hundreds of times longer than prior art tethers in harsh environments where a single-line tether experiences a substantial risk of failure. The specific industrial applications of an electrodynamic tether system to deorbit satellites and a low Earth orbit to lunar surface tether transport system are all part of the general innovative concept of the invention.

3 Claims, 28 Drawing Sheets

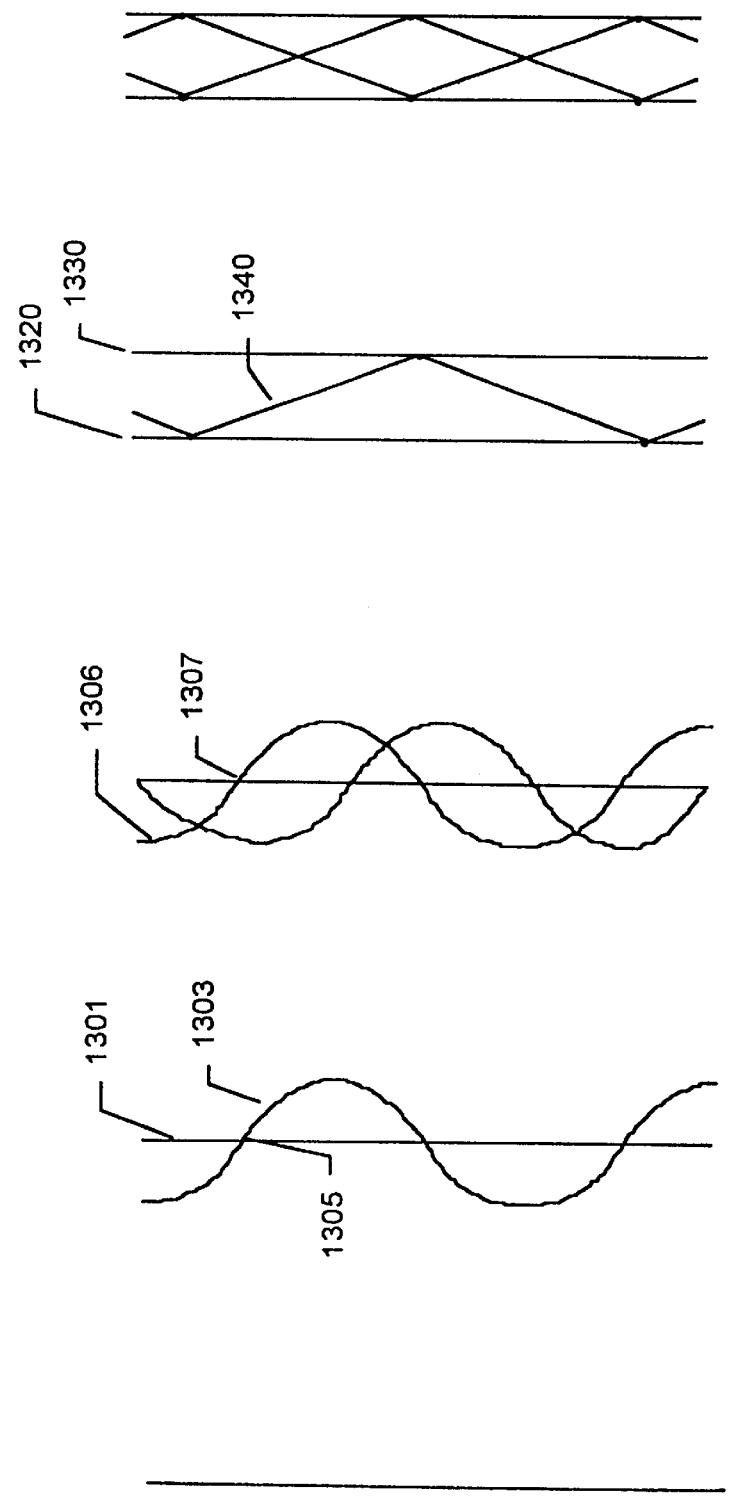

ALTERNATE INTERCONNECTION HOYTETHER FAILURE RESISTANT MULTILINE TETHER

CROSS REFERENCE TO RELATED APPLICATIONS

This application is a divisional of U.S. patent application Ser. No. 09/403,033 filed Oct. 22, 1999, which is the U.S. national phase of international application PCT/US97/05840 filed Apr. 22, 1997, now U.S. Pat. No. 6,173,922.

RESERVATION OF RIGHTS

This application is subject to an assignment of certain rights to Gary Pansey as defined by an agreement between Gary Pansey and Tethers Unlimited dated Jul. 4, 1996. This application may also be subject to certain rights of the U.S. government as a result of contracts between the U.S. government and the inventors.

TECHNICAL FIELD

The present invention is a tether having the special technical feature of multiple primary load-bearing lines and normally slack secondary lines. These primary and secondary lines are connected together with knotless, slipless interconnections so the tether maintains high strength and some of the lines can be cut without failure of the tether. This type of failure resistant tether may be safely operated near the ultimate failure load of the material from which it is constructed. Such high strength, fail-safe tethers have industrial utility both on Earth and in harsh environments, such as outer space, where a single-line tether experiences a substantial risk of being cut by debris impact.

These tethers' structures, methods of making, deploying and using them; including the specific industrial applications of an electrodynamic tether system to deorbit satellites and a low Earth orbit to lunar surface tether transport system are all part of the general innovative concept of the invention.

BACKGROUND ART

The background art includes tether structures, knotless, slipless connections between lines, tether fabrication and deployment, and space systems using tethers.

Tethers

A tether was originally a rope or chain used to fasten an animal so that it grazed only within certain limits. However, there are many specialized tether uses including bungie jumping and weather balloons. Short tethers have been used for decades in space to attach astronauts to their spacecraft.

In 1974 Professor Guiseppe Colombo, holder of the Galileo chair of astronomy at the University of Padua in Italy, proposed using a long tether to support a satellite from an orbiting platform. U.S. Pat. No. 4,097,010, which issued to Professor Colombo and Mario Grossi on Jun. 27, 1978, teaches a satellite connected by means of a long tether to a powered spacecraft. Colombo actively pursued the design of a tethered satellite system.

Several NASA experiments, such as the two Small Expendable Deployer System (SEDS 1 & 2)) and the Plasma Motor Generator (PMG) used tethers in space. SEDS used a nonconducting tether. The PMG used a 500-meter conducting tether. The Tethered Satellite System flights in 1992 and 1996 (TSS-1 & 1R) used a 22,000-meter conducting tether.

On the TSS-1 mission the tether deployed only 260 meters (853 feet) before the deployer failed. On the TSS-1R the tether was deployed 17,000 meters. In the SEDS-2 flight, a 0.8-mm diameter, 20,000-meter long braided single-line tether was deployed to study tether dynamics and lifetime. Orbital debris or a meteoroid severed this tether in less than four days.

Electric potential is generated across a conductive tether in motion across the Earth's magnetic field lines. Electromagnetic forces acting on a conductive tether in orbit can make the tether system behave like an electric motor or generator, to exert useful force to alter the state vector of any mass attached to the tether.

In the TSS-1R flight, the conducting single-line tether was severed after five hours of deployment. This failure was caused by an electric arc produced by the 3,500 volts of electric potential generated by the conductive tether's movement through the Earth's magnetic field.

The Tether Physics and Survivability (TiPS) satellite consists of two end masses connected by a 4,000-meter long non-conducting tether. This satellite was deployed on Jun. 20, 1996 at an altitude of 1,022 kilometers (552 nautical miles). Its tether is an outer layer of spectra 1000 braid over a core of acrylic yarn. The yarn will "puff" its outer braid to two millimeters to "give it a larger cross section to improve its resistance to debris and small micrometeoroids", according to the National Reconnaissance Office (NRO), which is a sponsor of the TiPS mission. As of Jan. 13, 1997 the TiPS tether had survived 207 days.

These experiments, all using single line tethers, illustrate the problem that long-duration and high-value tether missions require a tether capable of surviving single-point failures due to space impactors, electric arcing, or localized material defects.

In 1991, one of the present inventors, Robert Hoyt, invented a lightweight net-like structure that provides many redundant load-bearing paths. A number of primary load bearing lines running the length of the structure are connected periodically by diagonal secondary lines. Where the secondary lines intersect the primary lines, they are firmly connected by knots. The secondary lines are connected only to the primary lines. At either end of the structure, a support ring enforces the cylindrical spacing between the primary lines. The secondary lines are designed with a small amount of slack. These secondary lines are only put under load if a primary line fails. This invention was disclosed in 1992 (Forward, R. L., "Failsafe Multistrand Tether Structures for Space Propulsion", AIAA paper 92-3214, $28^{th}$ Joint Propulsion Conference, Nashville, Tenn., 1992 (hereinafter "1992 AIAA Document"). This structure was named a "Hoytether". The term "Hoytether" is used throughout the remainder of this disclosure for this type of structure.

The 1992 Hoytether design teaches that the normally slack secondary lines have half the cross-section (0.707 the diameter) of the primary lines. There are twice as many secondary lines as primary lines, thus the mass of the secondary lines is equal to the mass of the primary lines. In an undamaged Hoytether, the primary lines carry the entire load, while none of the secondary lines are under load.

While the survival probability of a single-line tether decreases exponentially with time, the Hoytether can maintain a high, i.e. greater than 99 percent, survival probability for periods of months or years (Forward and Hoyt, Paper AIAA 95-2890, $31^{st}$ Joint Propulsion Conference, July 1995).

Slipless High Strength Line Connections

The Hoytethers and apparatus that use Hoytethers taught by the present invention require that the primary lines be firmly connected to the secondary lines, without slipping, at their crossover junctions. The original Hoytether design did not teach the use of slipless connections. It used knots to connect the primary lines to the secondary lines. Knots cause stress concentrations, which limit the ultimate strength of the overall tether structure. It is essential that the interconnections between the primary and secondary lines be slipless to ensure proper redistribution of the loads when a segment of a primary line fails. The secondary lines in the original Hoytether design were not connected to each other.

Manufacturing companies that make fishing nets use three different knotless, slipless methods of interconnecting two lines. One is used for braided lines; one for twisted lines and one for crocheted lines. Hoytether uses lines braided of three or more smaller lines. These braids must be interwoven where they cross each other to form knotless, slipless interconnections. Alternatively the Hoytether lines may be knitted together. There is a lack of references in the field of braiding. Most of them are instruction books for hand braiding. Appendix B of the Final Report of NASA Contract NAS8-40545 (hereinafter 'NASA Report-1995', which is incorporated by reference), written by the present inventors, provides a summary of braiding fundamentals at pages B-1 to B-5. The information in NASA Report-1995 is proprietary in accordance with FAR 52.227-20 until Jun. 14, 1999. No prior art known to the inventors teaches a method of slipless knotless interconnection between a larger diameter primary line and two smaller diameter secondary lines.

Tether Fabrication

The Hoytether is essentially a tri-axial net structure, with 'primary' lines running along the length of the tether and two sets of 'secondary' lines connecting these primaries diagonally. They can be made by hand and connected with knots. Because knotted connections severely limit the strength of a structure, it is desirable to use a knotless fabrication technique to achieve interconnections that have strengths approaching the limits of the constituent material. As these tethers may be many kilometers long, fast and inexpensive mechanical methods are required for their practical fabrication.

The present invention may be made by mechanical braiding, i.e. three-dimensional braiding, such as 3-D rotation braiding using braiding machines such as those developed by the Herzog Company in Germany (August Herzog Maschinenfabrik GmbH & Co., Postfach 2260.26012, Oldenburg, Germany. The specialized loom developed by the Nichimo Company of Japan (Nichimo Company Ltd., 2-6-2 Ohtemachi, Chiyoda-Ku, Tokyo, Japan) is used to produce "Ultracross" knotless fishing nets in which the individual strands are braided as a 4-braid line, and the strands are interbraided where they cross. This produces netting that has slipless interconnections that are very strong, approaching the maximum capability of the fiber. Such a loom could, with some modifications, produce the present invention's structure. Only two such machines exist, one in Japan, the other in Washington State. Unfortunately neither can work with the small line diameters needed to practice the preferred embodiment of the present invention. See generally, Ko, F. K., "Braiding", in *Engineered Materials Handbook, Vol. 1, Composites.* ASM International, Metals Park, Ohio, 1957. Pp. 519–528.

The most common 3-dimensional braiding machines are 4-step braiders based upon the designs of Maistre (German Patent P230-16986, issued 1973) and Forentine (U.S. Pat. No. 4,312,261, issued 1982). Braiding is accomplished by using pneumatics or solenoids to push the parts of the braiding machine to the proper positions. This is a slow process and making a Hoytether kilometers long with these machines would be very time consuming and expensive. The composites division of Albany International (Albany International Research Company, 777 West Street, Mansfield, Mass.) also produces a 3-D braiding machine. This machine uses modular braiding components that are assembled breadboard fashion on a large wall.

While braiding is often used in producing high-strength cables and composite materials, most textile materials are fabricated using knitting and weaving processes. Two such techniques that have the potential for fabricating multiline tether structures include Raschel knitting and 3-D weaving. 3-D weaving requires the use of a cross fiber that adds to the weight, but not to the strength of the tether. The Fukui Company of Japan manufactures knitted netting by a proprietary technique (Fukui Net Company, Ltd., PO Box 119, Island View Drive, Golden Lake, Ont., Canada K0J 1X0.) Fukui produced a sample Hoytether wherein the primary lines were generated as a 4-strand knitted structure and the secondary lines were created by exchanging yarns from one primary to another. Although the secondary lines were interwoven into the primaries, they were exchanged between primaries in such a way that some of the interconnections were not slip-proof joints. As a result, a primary line cut tended to cause this knitted structure to collapse. It may be possible to use Raschel knitting to produce joints that are slipless and could be used to practice the present invention.

Tether Systems

The prior art teaches the use of tethers in space applications. U.S. Pat. No. 5,163,641, issued on Apr. 9, 1990 to Yasaka, teaches the use of a powered spacecraft connected by a tether to a satellite. This tether is disconnected to change the state vector of the satellite. The state of the art of energy and momentum transfer using space tethers is discussed in Ivan Beckey's article "Tethering a new Technique for Payload Deployment", Aerospace America, March 1997, at pages 36–40. Beckey concludes, "Tethers can perform the same functions as propulsive upper stages of direct payload injection, but at lower weight and cost per pound." U.S. Pat. No. 4,923,151, issued Mar. 1, 1988 to Roberts, Wilkinson and Webster, teaches a tether power generator for earth orbiting satellites. U.S. Pat. No. 4,580,747, issued Mar. 15, 1983 to Pearson, teaches use of a long tether extending downward into the atmosphere from a satellite. The state vector of the satellite is changed by forces acting on a lifting body connected to the end of the tether. U.S. Pat. No. 4,824,051, issued Jan. 12, 1987 to Engelking, teaches passing an electric current through a conductive tether attached to a satellite to provide propulsive force to alter the orbit of the satellite. U.S. Pat. No. 5,082,211, issued Jan. 21, 1992 to Werka, teaches use of a tether to deorbit space debris. U.S. Pat. No. 4,727,373, issued Mar. 31, 1986 to Hoover, teaches an orbiting stereo imaging radar system having two spacecraft in synchronous parallel orbits connected by a tether.

The following references are illustrative of the current state of the art in space tethers:

1. Paul A. Penzo and Paul W. Ammann. Tethers in Space Handbook—Second Edition. NASA Office of Space Flight, NASA Headquarters, Washington, D.C. 20546. See the hundreds of references in the 33 page bibliography at the end of the handbook.
2. Joseph A. Carroll, "SEDS Deployer Design and Flight Performance." paper WSEDS-A-1 at the 4th International Conference on Tethers In Space, Washington D.C., April 1995.

3. Robert L. Forward, Failsafe Multistrand Tethers for Space Propulsion, Forward Unlimited, P.O. Box 2783, Malibu, Calif. 90265, July 1992, Final Report on NASA Contract NAS8-39318 SBIR 91-1 Phase I.
4. Robert L. Forward and Robert P. Hoyt, Failsafe Multistrand Tether SEDS Technology Demonstration, Final Report on NAS8-40545 with NASA/MSFC (Jun. 14, 1995).
5. Robert L. Forward and Robert P. Hoyt, "High Strength-to-Weight Tapered Hoytether for LEO to GEO Payload Transfer" Final Report on contract number NAS8-40690 with NASA/MSFC (Jul. 10, 1996).
6. Hans Moravec. "A Non-Synchronous Orbital Skyhook". J. Astronautical Sci., 25(4):307–322, October–December 1977.
7. Robert L. Forward. "Tether Transport from LEO to the Lunar Surface". In AIAA/SAE/ASME/ASEE 27th Joint Propulsion Conference, Sacramento, Calif., June 1991. AIAA Paper 91-2322.
8. Joseph Carroll. "Preliminary Design of a 1 km/sec Tether Transport Facility", Technical Report, Tether Applications, 2603 Crosshaven Lane, San Diego, Calif. 92139, March 1991. Final Report on NASA Contract NASW-4461.

DISCLOSURE OF THE INVENTION

The structure, fabrication and use of a tether having a plurality of primary (load bearing) lines and knotless, slipless interconnected, normally slack secondary (non-load bearing) lines, called a "Hoytether", is the single general inventive concept of the present invention. This Hoytether is the special technical feature common to all the claims. It is a contribution to the art that each embodiment of the invention disclosed herein, considered as a whole, makes over the prior art.

The technical problem solved by this invention is catastrophic failure of single line tethers due to impact of debris, materials defects or electrical arcing (for electrodynamic tethers). The SEDS and TSS experiments cited above highlighted this technical problem. This type of failure is unavoidable due to the "1/e" failure curve which physics demands of any single line tether. Tether failures on these missions cost hundreds of millions of dollars and wasted years of research. The conventional solution to this problem is shown by the TiPS mission, also cited above. For this mission the single line tether was "fluffed up" to "give it a larger cross section to improve its resistance to debris and small micrometeoroids". The invention disclosed and claimed herein provides a radically different, technically superior and nonobvious solution to this problem.

How superior is a Hoytether to a single line tether? Theoretically, the increase in Hoytether lifetime over the lifetime of a single-line tether for the same mass is approximately proportional to the number of interconnection levels in the Hoytether and inversely proportional to the number of Hoytether lines to the ¾ths power. The number of interconnection levels typically range from 1000 to 1,000,000, while the number of lines varies from 2 to 12. Because of the large number of interconnection levels, Hoytethers can be expected to survive 10 to 1000 times longer than a single-line tether of the same mass in the same environment. FIG. 1 shows the small impactor survival probability of equal weight single line and Hoytethers for a low-load mission.

Another benefit of the invention is that the survival probability curve of the Hoytether as a function of time does not conform to the standard "1/e decay" shape of a single-line tether. The Hoytether maintains a high level of survival probability, about 99 percent, until it nears its 'lifetime'. Its survival probability then drops rapidly to zero. A detailed mathematical analysis of the difference between Hoytether and single tether survival probabilities is given in Appendix E "Small Impactor Survival Probabilities of Hoytethers" and Appendix F "Large Orbital Debris Survival Probabilities of Hoytethers", both in NASA Report—1995, which is incorporated into this disclosure by reference. The resulting cut probability with time for the Hoytether has a pure "bingo curve" shapes. In a bingo game, at least five numbers must be called before anyone can win, and usually many numbers have to be called before one of the bingo cards gets five in a row. In the present invention, at least three cuts must happen at the same level before any failure occurs, and many cuts have to be made before any one of the levels has all three lines cut. The bingo curve has the property that the probability of survival stays very high for periods short compared to the lifetime. The probability of survival is greater than 99.9% for periods shorter than 10% of the lifetime. This is much better performance than the 1/e curve of a single line tether, where the probability of survival is only 90% at 10% of the 1/e lifetime.

For a NASA statement confirming this conclusion see the text and charts at:

The present invention is discussed in this disclosure in terms of its space applications. It should be understood, however, that the Hoytether is useful in any application where the tether must be operated without failure for long periods of time in hostile environments and/or safely when the load is near the ultimate strength of the tether material. One example would be the mooring or towing lines used with large ocean going ships.

BRIEF DESCRIPTION OF THE DRAWINGS

FIG. 10a shows one primary line cut. FIG. 10b shows two adjacent primary lines cut. FIG. 10c shows two opposing primary lines cut. FIG. 10d shows a nodal junction cut. FIG. 10e shows distant adjacent primary lines cut. FIG. 10f shows distant opposing primary lines cut.

FIG. 12b shows a corespun yam with high tenacity fibers protected by atomic oxygen resistant fibers.

FIGS. 13a–13e show alternate aerodynamic tethers with drag areas equal to a single line tether.

BEST MODE FOR CARRYING OUT THE INVENTION

The present invention's solution to the technical problem of single tether catastrophic failures comprises several embodiments of Hoytether structures, methods of Hoytether manufacture, deployment and uses.

A. Hoytether Structures

1. Knotless Slipless Connections

In this embodiment of the invention the primary and secondary lines of the Hoytether are connected by knotless, slipless connections to increase tether strength. The original Hoytether design (1992 AIAA Publication, cited above) required that the secondary lines be connected to the primary lines by knots, which reduces the strength of the Hoytether to far below, even less than 50 percent, of the ultimate strength of the materials from which it is fabricated. The use of knotless connections that are slipless when the tether is under load between the primary and secondary lines defines a Hoytether structure whose system strength approaches the ultimate strength of the material from which it is made.

Figure 2C:
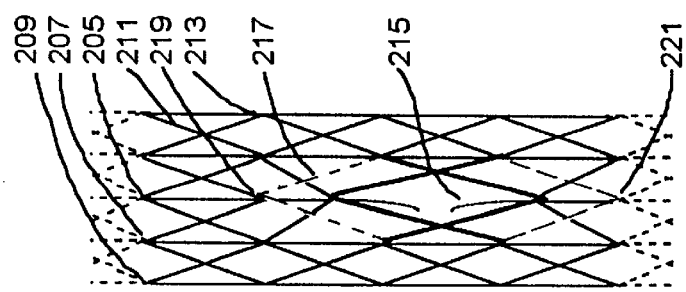
FIG. 2c is a schematic of a Hoytether showing how secondary lines redistribute load around a failed primary line when the secondary lines ae not connected at their cross-over points.
Figure 2B:
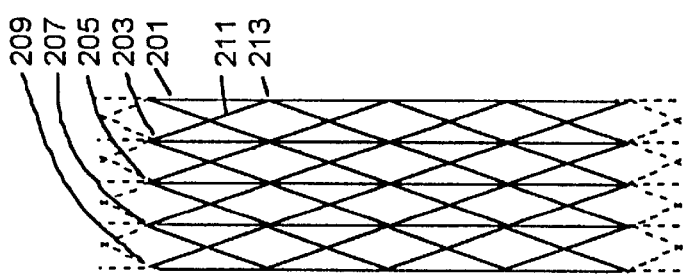
FIG. 2b is a schematic of an undisturbed Hoytether.
Figure 2A:
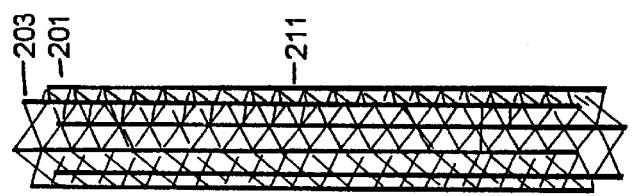
FIG. 2a is an isometric drawing of a section of a tubular Hoytether ("Hoytube").

FIG. 2a is an isometric drawing showing the generally cylindrical structure of the Hoytether. In FIG. 2a, primary lines 201 and 203 are shown connected via secondary lines 211. In FIG. 2b, which is a schematic illustration of the structure shown in FIG. 2a, primary lines 201, 203, 205, 207 and 209 are connected, each to their respective adjacent primary lines, by a plurality of secondary lines 221. These connections, for example as show at interconnection 213, are made by knotless, slipless interconnections, such as Soutache braiding of twisted connections.

These lines may be made of any high strength material, for example Spectra 2000 having a denier of 900 a tenacity of 37 g/denier and a tensile strength of 3.0 GPa. Other materials such as wires, glass fibers or microtubular carbon fullerenes may be used.

FIG. 2c shows the Hoytether structure of FIG. 2b but with a severed primary line 205 at breakpoint 215. The second level of secondary lines 217, shown as bold lines in FIG. 2c, redistribute the load from the severed primary line 215 at point 217 back to line 215 at points 219 and 221, above and below the break, respectively.

2. Tri-line Hoytube

Figure 7:
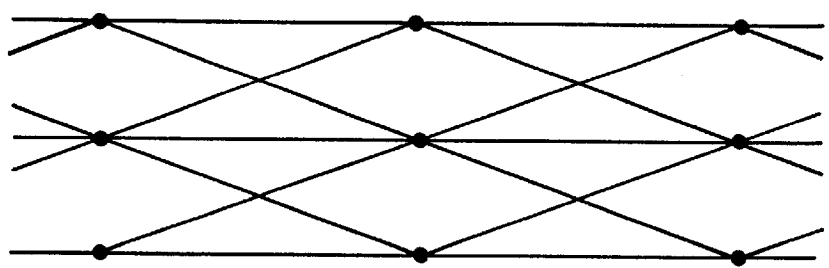
FIG. 7 illustrates the Tri-line Hoytether design.

This tether design consists of three primary lines arranged in a triangle, with three pairs of secondary lines zigzagging between adjacent primary lines. FIG. 7 shows this embodiment of the present invention schematically.

3. Multi-line Hoytube

This tether design consists of n primary lines arranged in a circle spaced at 360/n degrees, with n pairs of secondary lines zigzagging between adjacent primary lines. This is the "canonical" Hoytether. Once the number of lines exceeds four, the structure has the nice property that it doesn't collapse into a nearly flat tape upon cutting. Also, when a primary line is cut, its place is taken by two pairs of secondary lines, which carry the load in parallel around the broken segment of primary line, which had been carrying the load in series. First, since the secondary line pairs are only being asked to carry half the load, they each only need to be one-quarter the area of the primary lines, or one half the diameter. Second, upon close examination of the stresses in the neighboring lines, we found that cutting the primary line actually UNLOADS the lines around it, improving the survival probability from future cuts in that region. With proper design of the secondary lines' length and angle, the load is ultimately put back onto the remainder of the cut primary, so that the rest of the tether is unaffected by the distant cut.

4. Offset Connection Hoytube

This tether design is with the connection points of the secondary lines to primary lines "offset" or "staggered", so that when the tube is collapsed into a cylinder for winding and deployment, the thicker portions are distributed along the line instead of bunching up at one point and causing thickness variations that must be coped with by the deployment machinery.

5. Connected Secondary Lines

In this embodiment of the invention the secondary lines are connected together to better redistribute load and to prevent necking in of the Hoytether. In the 1992 Hoytether design, the secondary lines crossed over each other near their midpoints, but they were specifically taught as not being connected together. As is shown in FIG. 3, if the secondary lines are connected together where they cross over, then the damage due to a cut line is localized more than if the secondary line are not connected.

Figure 1:
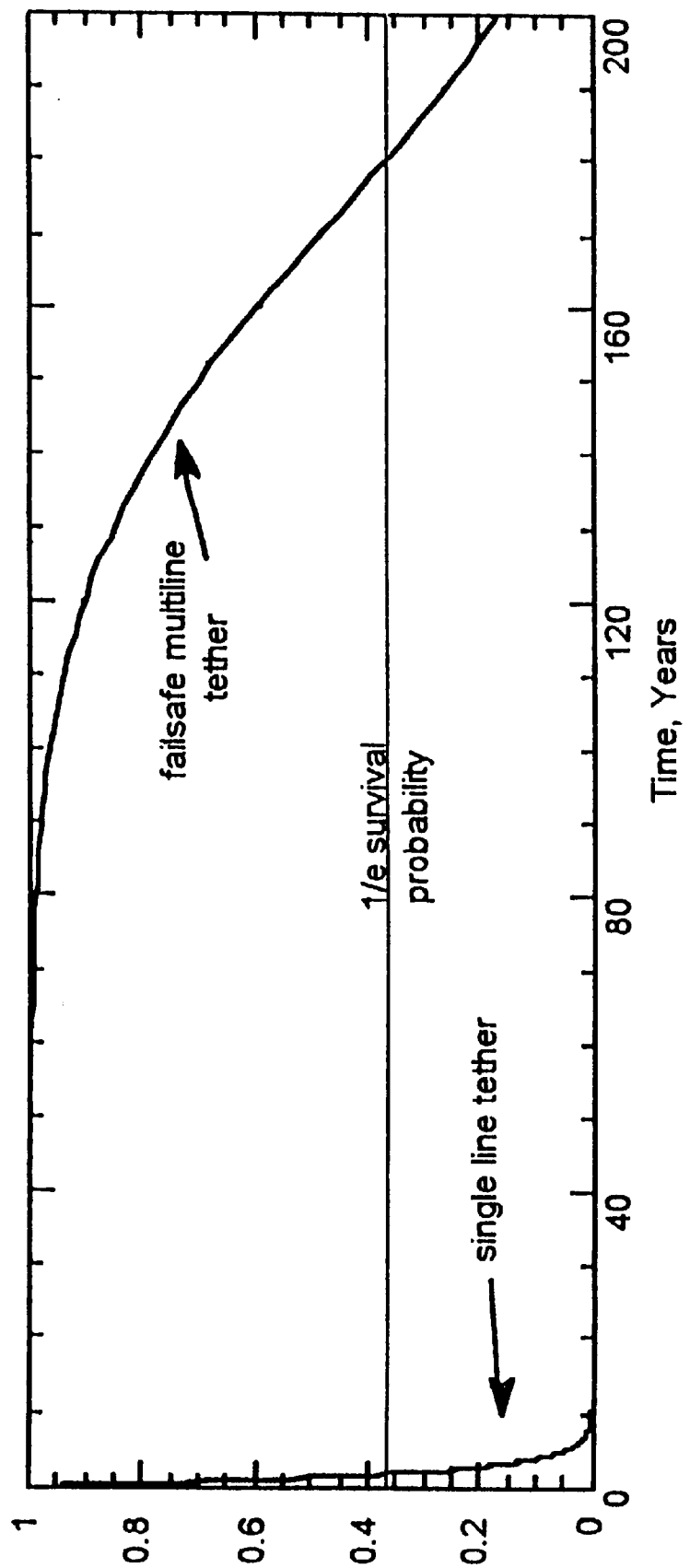
FIG. 1 is a chart showing the small-impactor survival probability comparison of equal-weight single line and failsafe multiline tethers for a low-load mission.
Figure 3:
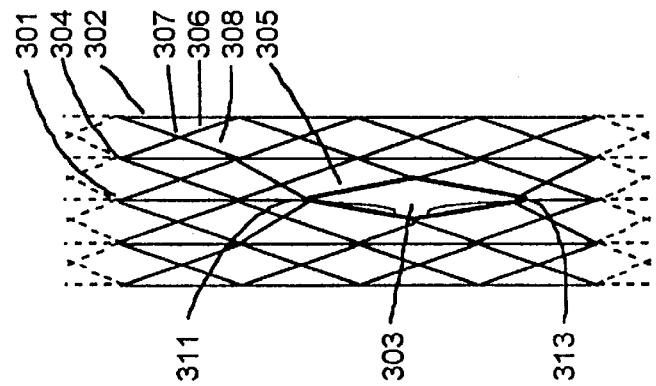
FIG. 3 is a schematic of a Hoytether showing load redistribution paths when secondary lines are connected at their cross-over points.

In FIG. 3 primary line 301 has been severed at point 303. In FIG. 3 primary lines 302 and 304 are connected by secondary lines 306 and 308. Where lines 306 and 308 cross at point 307, they are connected by a knotless, slipless interconnection. These connected secondary lines 305 proximate break 303, shown in bold in the drawing, force the load redistribution from the broken primary 301 to points 311 and 313 on line 301 above and below the break, respectively.

Figure 4A:
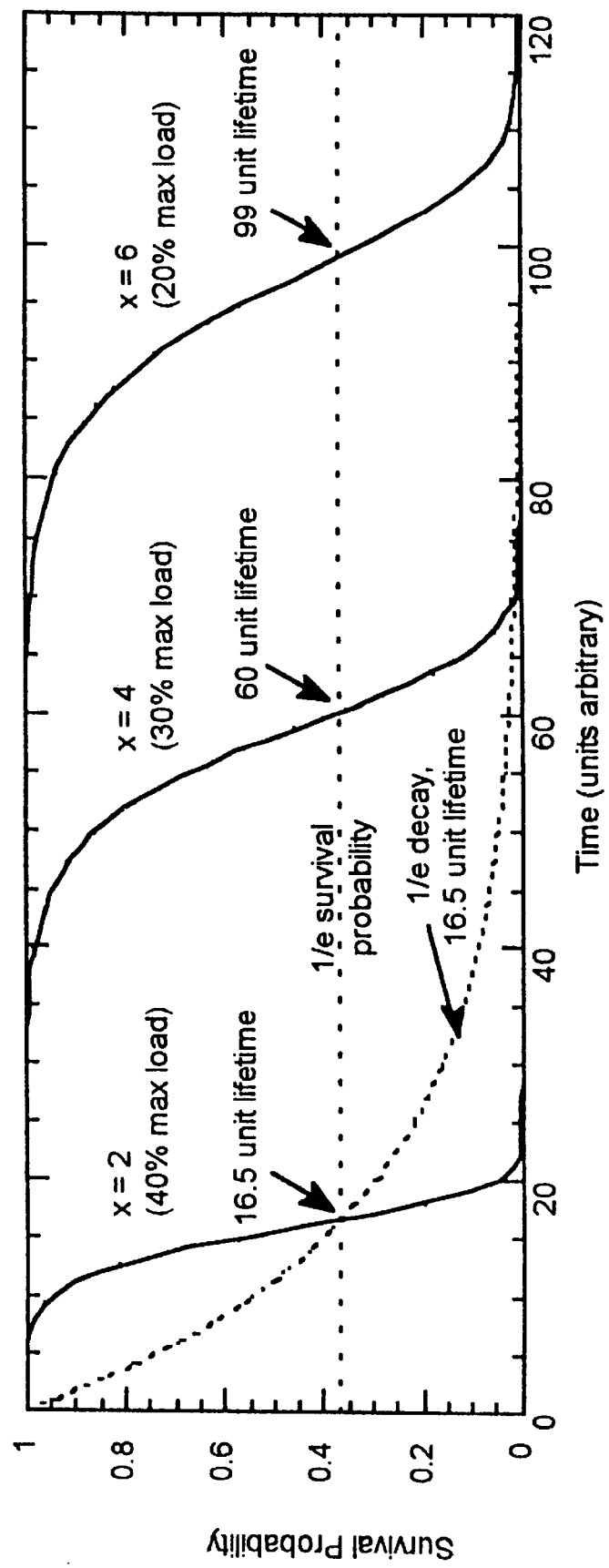
FIG. 4a is a chart showing survival probability variation vs. time for different number of primary line cuts.
Figure 4B:
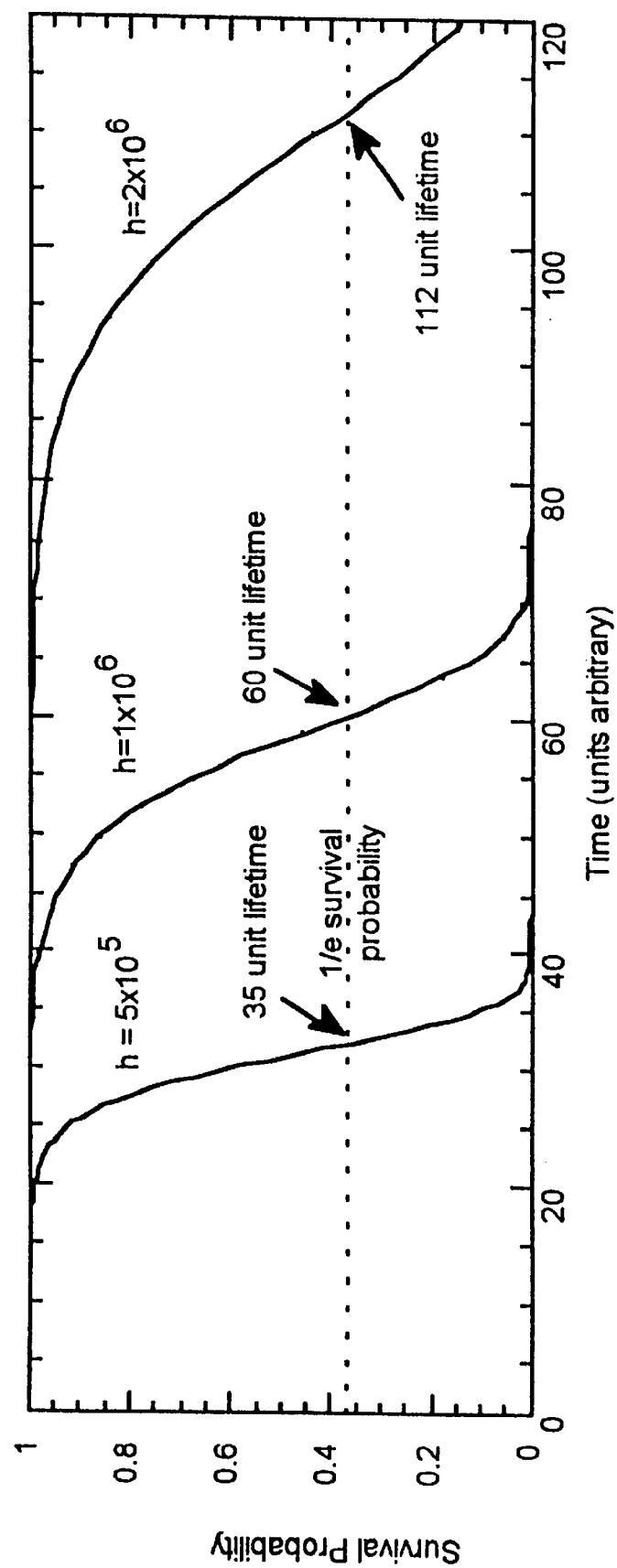
FIG. 4b is a chart showing survival probability vs. time for variation in number of interconnected levels.
Figure 4C:
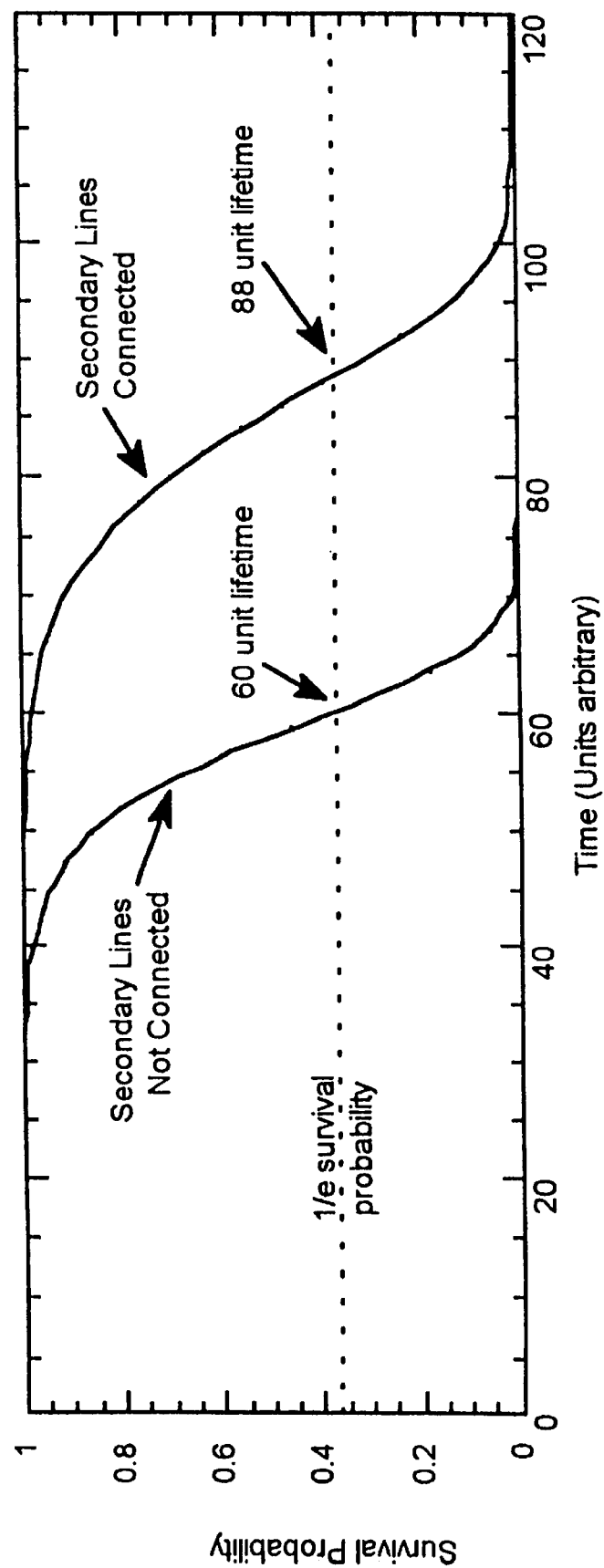
FIG. 4c is a chart showing survival probability for a Hoytether with secondary lines connected and not connected.

FIG. 4a shows the survival probability of a Hoytether plotted against time as a function of variation in the number of critical primary lines cut. FIG. 4b plots survival probability against time as a function of the variation in the number of levels of primary-secondary interconnection. FIG. 4c plots survival probability as a function of whether or not the secondary lines of the Hoytether are connected to each other. As is illustrated by this graph, connecting the secondary lines produces a significant improvement in survival probability for the tether system.

Figure 5B:
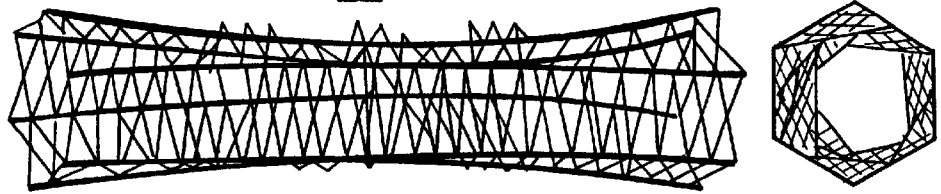
FIGS. 5a and 5b show Hoytether sections with secondary lines connected (5a) and unconnected (5b) after 20 random cuts (six primary line cuts in each case).
Figures 5A, 5C, 5D:
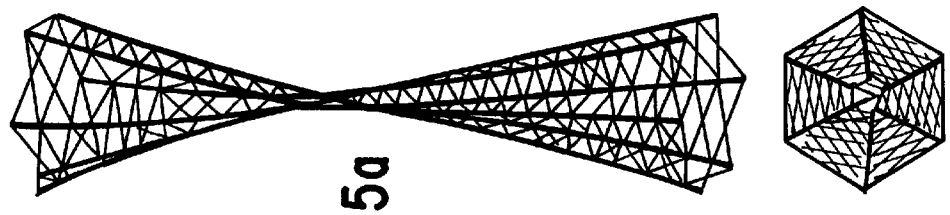
FIGS. 5c and 5d show the cross sectional view of the Hoytether sections in FIGS. 5a and 5b.

In addition, as is shown in FIGS. 5a and 5b, the amount of "necking in" of the tether diameter in the damaged region of a Hoytether whose secondary lines are connected together is significantly less. Thus connecting the secondary lines together significantly increases the survival probability of the tether when primary lines are cut.

6. Flat Tape

This embodiment of the invention is a flat, tape-like Hoytether, called a "Hoytape". A plurality of primary lines disposed in a plane carry the load. These primary lines are interconnected through knotless, slipless connections with secondary lines that run diagonally within the plane defined by the primary lines. This embodiment is easy to roll up on a core, like ribbon or tape, and thus is easy to deploy. The lines in this embodiment, or any other embodiment, of the invention may be encased in a carrier, such as a plastic film, for ease of handling and maintenance of adequate separation between the primary lines.

a. Bi-line Half Hoytape

This tether design is shown in FIG. 13d consists of two primary lines 1320 and 1330 and one secondary line 1340 that zigzags back and forth between connections to the two primaries. Although the secondary line could be smaller in diameter than the primary lines, and tether failure occurs when just two of the three lines are cut, the preferred embodiment would have the secondary line the same diameter as the primary lines, and tether failure occurs when all three lines have been cut. This tether design has essentially the same space impactor lifetime properties as any of the Double Snake Caduceus designs, which are described below.

b. Bi-line Hoytape

Figure 6:
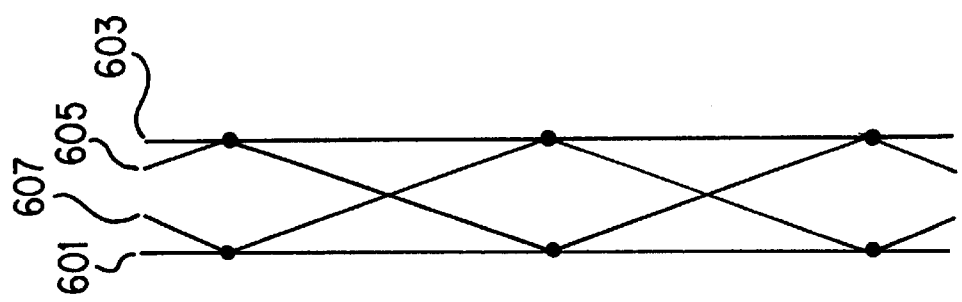
FIG. 6 illustrates the Bi-line Hoytether design.
Figure 10A:
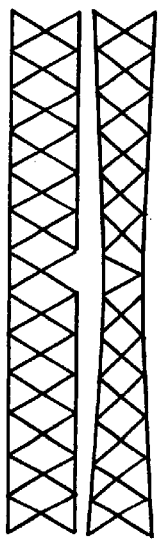
FIGS. 10a–10f are schematics of a section of a low-drag long-life Hoytether after various cuts in its lines.
Figure 10B:
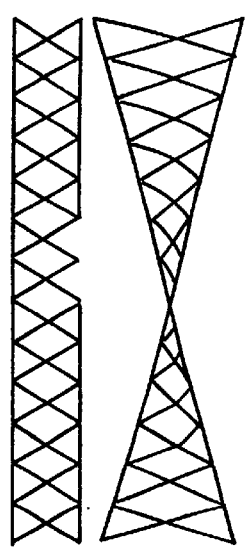
Figure 10C:
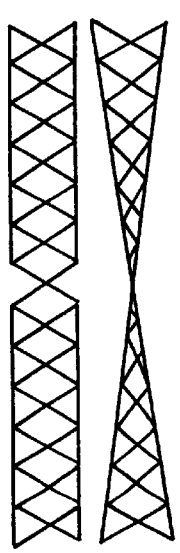
Figure 10D:
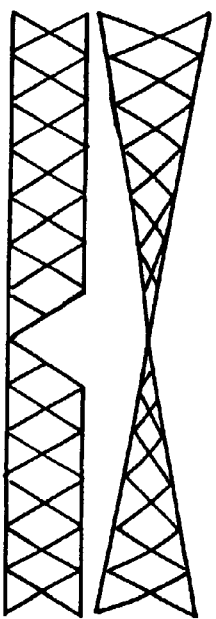
Figure 10E:
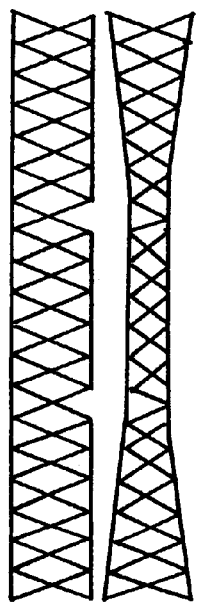
Figure 10F:
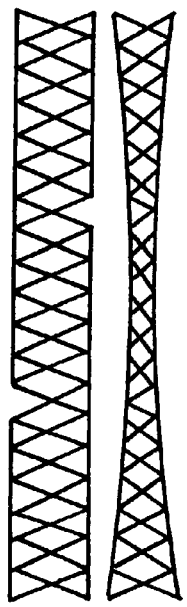

This tether design is the first of the true Hoytethers. As shown in FIG. 6, it consists of two primary lines 601 and 603 that carry the load in parallel, and two secondary lines 605 and 607 that zigzag back and forth at an angle between the two primary lines. In the preferred embodiment, all four lines are the same diameter, and any one of the lines can carry the load. This tether design has a significantly greater impactor cut lifetime than the three line Bi-Line Half Hoytape or any three-line Caduceus. The behavior of this structure under various cuts is shown in FIG. 10. FIGS. 10a–10f are schematics of a section of a low-drag long-life Hoytether after various cuts in its lines. FIG. 10a shows one primary line cut. FIG. 10b shows two adjacent primary lines cut. FIG. 10c shows two opposing primary lines cut. FIG. 10d shows a nodal junction cut. FIG. 10e shows distant adjacent primary lines cut. FIG. 10f shows distant opposing primary lines cut.

Alternate designs could have the secondary lines half the cross-sectional load-bearing area of a primary line, and failure occurs when two primary and at least one of the secondary lines have been cut.

c. Bi-line Secondary-connected Hoytape

This tether design is that of b. with the secondary lines connected where they cross each other. As was discussed above, this improves the survival probability significantly.

d. Multi-line Hoytape

This tether design is an extension of the Bi-Line Hoytape to three or more primary lines, with two secondary lines criss-crossing between the primary lines. The Tri-Line Hoytape with secondary lines not connected has been fabricated in Spectra polymer.

e. Multi-line Secondary-connected Hoytape

This tether design is that of d. with the secondary lines connected where they cross each other. This improves the survival probability significantly.

f. Offset Connection Hoytape

This tether design is that of b. through e. with the connection regions of the secondary lines to the primary lines offset, so that they occur at different points along the lengths of the primary lines. During the connection process the combined lines become thicker than the combined line diameters. By staggering the thicker regions, this minimizes the thickness change that must be accommodated by the winding and deployment mechanisms.

7. Optimum Low Mass/High Strength

In this embodiment of the invention more of the tether mass is put into the primary lines and less into the mass of the combined secondary lines. The decrease in secondary line mass can be half or more. This allows a given mass of tether to carry more load. If a primary line is cut, the load it was carrying is redistributed through several secondary lines. By adjusting the amount of slack in the secondary lines, this load can be carried by secondary lines both on the cut level and on secondary lines above the cut.

8. Central Core

This embodiment of the invention is a Hoytether with at least one additional, possibly larger diameter, central primary line running up the middle of the tether. Secondary line pairs connect each of the outer primary lines to the adjacent outer primary lines. Secondary lines also connect the central primary line to the outer primary lines. A "Matroshika" variation of this embodiment has several Hoytethers of different diameter disposed annularly and concentrically with the primary lines of each Hoytether connected to the primary lines of the others adjacent to it. This embodiment may be constructed as a rope or cable with the outer primary lines touching each other and the inner secondary lines tucked inside the rope until they are loaded by a failure of a primary line. The secondary lines may be colored differently than the primary lines to visually indicate damage to the Hoytether. This embodiment of the present invention can be used as a fail-safe cable for towropes, suspension bridges, elevator cables and the like.

9. Alternate Primary Connected

This embodiment of the invention is a Hoytether with an odd number of primary lines, and at least five primary lines, which has its alternate primary lines, rather than its adjacent primary lines, connected by the secondary lines. In this embodiment of the present invention the secondary lines form a star, called a "Hoystar", whereby the secondary lines are more internally disposed within the tether structure. This embodiment can be used with the solid Hoytether embodiment, described above.

10. Low-drag Long-life Atmospheric

Figure 9:
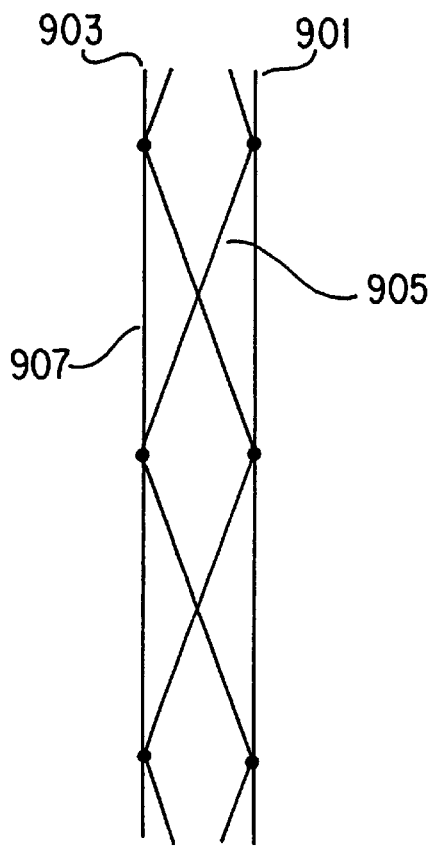
FIG. 9 is a schematic of a section of a low-drag long life Hoytether for atmospheric missions.
Figure 11:
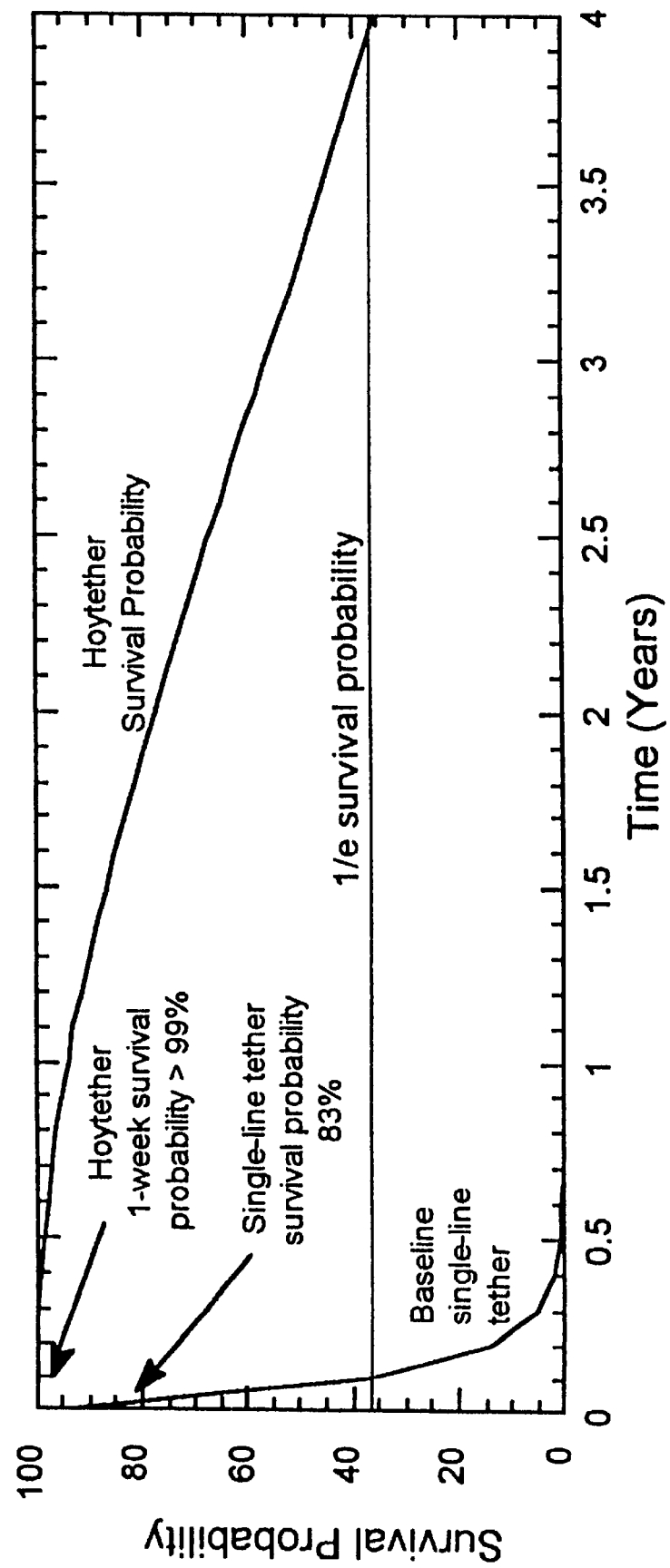
FIG. 11 is a chart showing survival probability for a specific single line tether and the Hoytether taught by the present invention.

This embodiment of the invention is shown in FIG. 9. It consists of a minimal flat tape type Hoytether comprising two primary load-bearing lines 901 and 903 and two secondary lines 905 and 907 of the same diameter. Short lengths of wires and fibers may be placed between the primary lines at intervals along the tether to restore the primary line separation after necking in has occurred due to space impactor cuts. The impactor cut behavior of this embodiment is also illustrated by FIG. 10, which was discussed above. The survival probability advantage of this Hoytether over a single-line tether of the same mass is shown on the graph in FIG. 11.

11. Atomic Oxygen Resistant

Figure 12A:
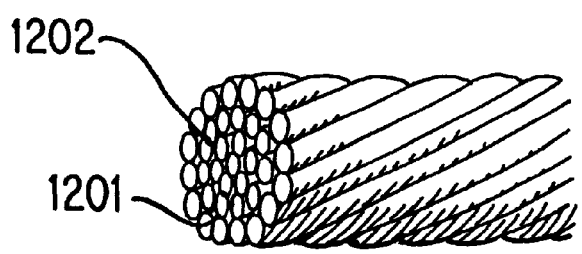
FIG. 12a shows a monocord yam with inner core of high tenacity fiber and a protective outer sheath of an atomic oxygen resistant fiber.

This embodiment of the invention is a tether structure made of atomic oxygen resistant materials, such as glass fiber, or fabricated of bi-component yarns, as is shown in FIG. 12a, where the outer layer 1201 would be resistant to atomic oxygen with a high tenacity fiber core of Spectra, Vectran, Kevlar etc 1202, or having the tether structure that is coated with an atomic oxygen resistant polymer. This tether could also be made as shown in FIG. 12b where a corespun yarn with high tenacity fibers 1204 are protected by an outer sheath of atomic oxygen resistant fibers 1206.

12. Offset Secondary Line Connection

This embodiment of the invention is a Hoytether wherein the secondary lines are connected to the primary lines unsymmetrically. Such an unsymmetrical design reduces the difficulty and cost of fabrication.

13. Counter-spiral Primary

This embodiment of the invention is a Hoytether wherein the primary lines are alternating sets of clockwise and counterclockwise spirals. Such a counter-spiral design allows the tether to be twisted more than 180 degrees without collapsing.

14. Ultralong

Although most applications of the 'terminator tether', which is described below as an industrial application of the present invention, will utilize short, many-line Hoytethers, there will be some applications where an optimal tether will need to be very long (100–10,000 km in length). The major application for these ultralong tethers would be where the magnetic field or the space plasma, or both, are weak, and a longer length of tether is needed to generate an adequate voltage at the ends of the tether to make adequate current contact with the space plasma. One application would be the use of a terminator tether to deorbit a spacecraft in GEO (Geosynchronous Earth Orbit). A spacecraft in GEO is rotating at the same angular rate as the Earth and the magnetic field of the Earth. Thus, it is not moving with respect to the magnetic field of the Earth, and the normal conclusion is that an electrodynamic tethers, such as the terminator tether, would not be able carry out its deorbiting function from that altitude. If, however, a substantial portion of the mass of the GEO spacecraft (expended orbit insertion motor, battery compartment, antenna, solar panels) was designed to be easily separable from the main spacecraft, then it could be deployed downward (or upward) from the main spacecraft by an ultralong tether. Lowering a mass from a GEO spacecraft by a 1000 km long tether, will cause the center of mass of the system to drop, causing the GEO spacecraft to change to a non-geosynchronous orbital period. This will produce movement of the spacecraft and its tether with respect to the magnetic field of the Earth, allowing the electrodynamic drag interaction to take place, initiating the deorbit process. Another application where an ultralong tether may be optimal is the use of a electrodynamic tether around another planetoid where the magnetic field and/or space plasma is weaker than around the Earth.

To keep the mass down on these ultralong tethers, the number of the lines will have to be reduced from the many lines in a typical Hoytether. These few-line tethers are not "Hoytethers" in the usual sense of the word, so they have been given different names in the following list.

Figure 8:
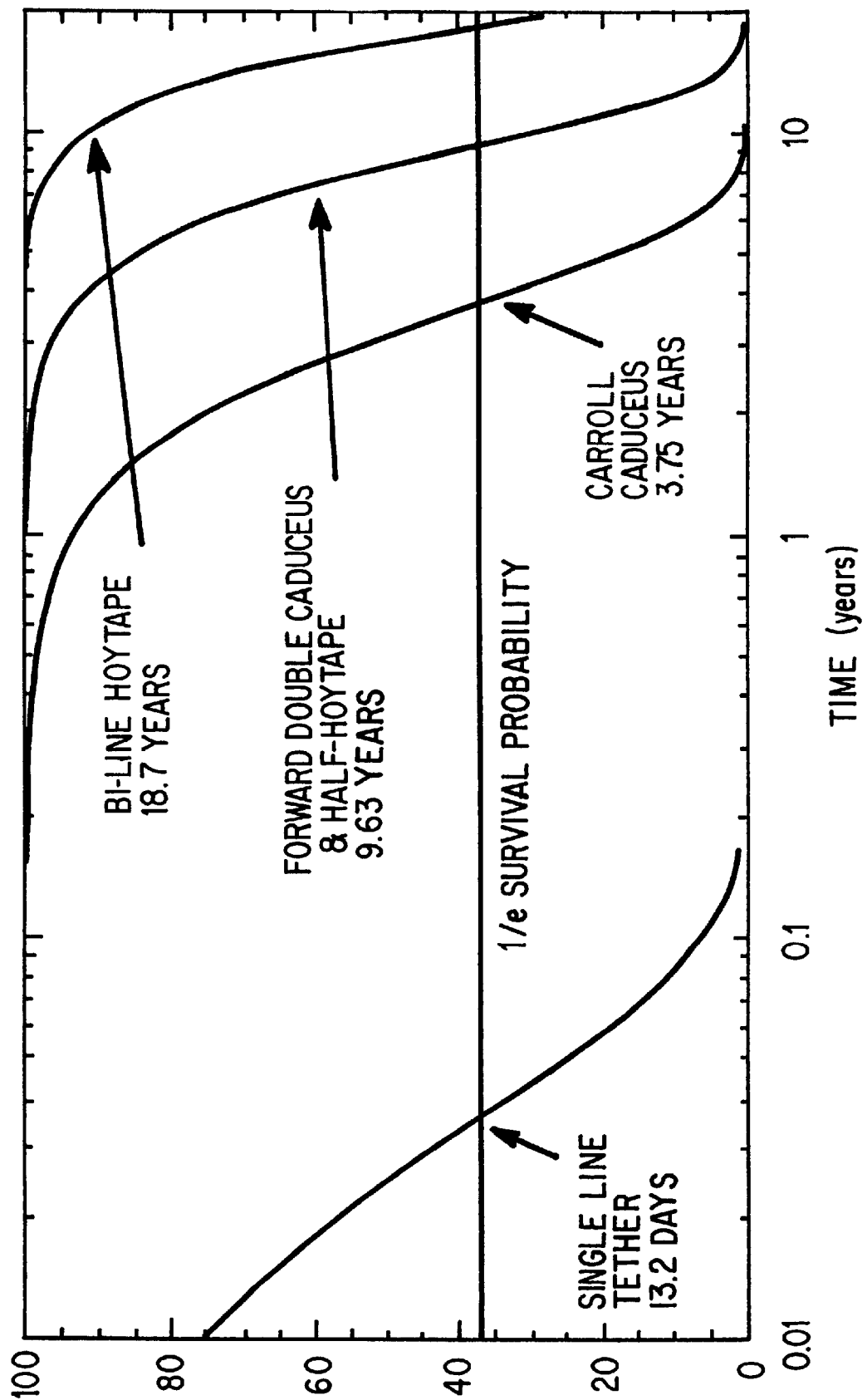
FIG. 8 is a chart showing the comparative lifetimes of alternate low-drag tethers.

FIGS. 13a–13e show alternate aerodynamic tethers with drag areas equal to a single-line tether. The comparative lifetimes of some of these low drag tethers is shown in FIG. 8.

a. Single Line

This tether design consists of a single line of solid, braided, twisted, or woven wire. It could be cylindrical in cross-section, but an elliptical or rectangular cross-section with a high aspect ratio will be more resistant to cutting by space debris. (A car seat belt is a woven structure 1-mm in thickness and 50 mm in width, for an aspect ratio of 50:1, so much greater aspect ratios are possible.) The typical space impactor cut 1/e lifetime of this design is measured from a few weeks for a cylinder, to many months for a tape with a large aspect ratio. The cut probability with time has a 1/e fall-off, which means that even at times short compared to the "1/e lifetime", there is a significant probability of failure [10% chance of failure at 10% of the 1/e lifetime.] This short lifetime makes it of marginal use for a TT. The single line is the tether proposed for the Loftus 'terminator tether' concept, which is discussed below.

b. Single Snake Caduceus (Carroll Caduceus)

This tether design shown in FIG. 13b consists of a single "primary" line 1301 that normally carries the entire load. This design was conceived by Joseph Carroll of Tether Applications. Tit is discussed here to show its failure modes, which are illustrative of the problems in the prior art which are solved by the present invention. Snaking up the primary line, and attached to it at intervals 1305, is a single "secondary" line 1303. This type of secondary line is sometimes called a 'snake' because the tether looks like a caduceus. The segments of secondary line are slightly longer than the load-stretched primary line, so the secondary line will naturally bend away from contact with the primary line. Typically the secondary line has the same diameter as the primary line so if a primary line is cut by space impactors, the secondary line can adequately handle the load. The typical space impactor cut lifetime of this design is a few years. This design has the problem that it has two catastrophic failure modes. The worst one is that a single impactor hitting a junction point will cut both the primary and the secondary line at the same time. A good design will minimize the junction length so that this failure mode has less probability than a cut of a primary line and a secondary line at the same level. A second, but less likely catastrophic failure mode is that a space impactor coming in the plane defined by the two lines could conceivably cut both of them, if the impactor were large enough not to fragment from the first collision.

c. Symmetric In-plane Double Snake Caduceus

This tether design is similar to b. except that the secondary line is divided into two lines. Provided the secondary lines can each handle the load alone, this design has a longer space impactor cut lifetime than b., since all three lines must be cut AT THE SAME LEVEL, for tether failure to occur. The junction catastrophic failure mode remains. If the secondary lines are 180 degrees from each other so that all three lines are in the same plane, then the in-plane catastrophic failure mode remains.

There is a secondary failure mode, in that if the primary line is cut first, then the two secondary lines take over the load jointly and instead of being separated from each other, now lie next to each other. They can now be both cut at the same time by a slightly larger impactor than would be needed to cut one of the lines alone.

d. Symmetric Out-of-plane Double Snake Caduceus

This tether design is similar to c., except that the secondary lines are separated by another angle than 180 degrees (typically 90 degrees), so that all three lines are NOT in the same plane. In this design, the junction catastrophic failure mode and the double-secondary cut failure mode remain, but the in-plane catastrophic failure mode is eliminated.

e. Non-symmetric Double Snake Caduceus

This tether design is similar to c. and d., except that one secondary line segment length is made longer than the other secondary line segment length. Thus, when a primary line is cut, the shorter secondary line segment takes the full load, while the longer secondary line segment remains bent away from the load-bearing secondary line segment. This eliminates the double-secondary cut failure mode. The junction catastrophic failure mode remains.

f. Multiple Snake Caduceus

This tether design is similar to c., d., e. above except three or more secondary line "snakes" are used. The addition of more secondary lines increases the space impactor cut lifetime and increases the contact area of the tether to the space plasma [up to the point where the secondary lines are closer to each other than the debye length]. Use of three or more secondary lines eliminates the in-plane catastrophic failure mode. The junction catastrophic failure mode remains.

g. Alternating Symmetric Double Snake Caduceus (Forward Double Caduceus)

This tether design, shown in FIG. 13c, is similar to c. and d., except that one secondary line 1306 is attached to the primary line 1301 at a different place than the other secondary line (typically half-way in between, i.e. point 1305). This tether design eliminates the junction catastrophic failure mode. If the secondary lines are at 90 degrees to each other, this eliminates the in-plane catastrophic failure mode. If both secondary lines have the same segment length, then this tether design retains the double-secondary cut failure mode.

h. Alternating Nonsymmetrical Double Snake Caduceus

This tether design is similar to g, except that one secondary line segment length is made longer than the other one. Now, if a primary line is cut, the shorter secondary line segment takes over the load, leaving the longer secondary line segment unloaded and free to bend away from the other secondary line, eliminating the double-secondary cut failuremode. The resulting cut probability with time of this tether design now has apure "bingo curve" shape. In a bingo game, at least five numbers must be called before anyone can win, and usually many numbers have to be called before one of the bingo cards gets five in a row. In this tether, at least three cuts must happen at the same level before any failure occurs, and many cuts have to be made before any one of the levels has all three lines cut. The bingo curve has the property that the probability of survival stays very high for periods short compared to the lifetime. The probability of survival is greater than 99.9% for periods shorter than 10% of the lifetime. This is much better performance than the 1/e curve of a single line tether, where the probability of survival is only 90% at 10% of the 1/e lifetime. This tether design with the two secondary lines at 90 degrees to each other and with one secondary line having shorter segment lengths than the other secondary line, is the preferred embodiment of a double snake caduceus tether.

i. Alternating Nonsymmetrical Multiple Snake Caduceus

This tether design is similar to f. and g., except that there are now three or more "snakes" alternating at their connection points to the primary line. By placing the n secondary lines at 360/n degrees from each other, the in-plane catastrophic failure mode is eliminated. Each additional secondary snake increases the lifetime. Normally, the number of snakes added is limited by a compromise between maximum lifetime and minimum tether mass. For an electrodynamic tether, however, it may be desirable to add more snakes to increase the contact area to the plasma. Again, this will be limited when the separation between snake lines becomes smaller than the debye length in the space plasma. This tether design is the preferred embodiment of a multiple snake caduceus-tether.

j. Alternating Multiple Paired Snake Caduceus

This tether design has a single primary line, and two or more alternately connected pairs of secondary line snakes, with each pair connected to the primary line at the same junction point and separated by 180 degrees. This line arrangement is more symmetric than i. and j., which might be desirable to improve the plasma contact area, and for improving the winding and deployment properties.

k. Alternating Multiple N-tupled Snake Caduceus

This tether design is similar to j., but instead of junctions of the primary line with pairs of secondary lines separated by 180 degrees, the primary lines junctions are to three lines separated by 120 degrees, or four 4 lines separated by 90 degrees, or n lines separated by 360/n degrees.

l. Alternating Nonsymmetrical N-tupled Snake Caduceus

This tether design is similar to j. and k., except that the secondary lines in each tuple are of different lengths, so than only one at a time is asked to carry the load when the previous load-carrying line is cut. This increases the survival probability slightly at the cost of decreasing the symmetry of the design slightly.

m. Secondary Lines Connected Caduceus

This tether design is similar to designs c. through k, but where the secondary lines touch each other, they are firmly connected together with a high quality joint that can take the load. This improves the tether lifetime somewhat, since the secondary line segment length is now shorter.

All of the Caduceus designs above can be designed, by proper choice of low-load and high-load elastic properties of the primary and secondary lines, using a combination of material properties, line construction, "crimping", temperature, and twisting, so that when the tether is wound under the proper load, the primary lines are "stretched" and the secondary lines "contracted" so that the primary line segment length equals the secondary line segment length, and the whole expanded caduceus structure collapses into a neat cylindrical bundle for ease in winding and deployment.

All caduceus tethers can be assisted by spreaders, either short lengths of monofilament bridging from one line to another that are fabricated along with the tether, or separate devices inserted periodically after fabrication.

B. Methods of Fabrication of Hoytether Structures

Figure 14:
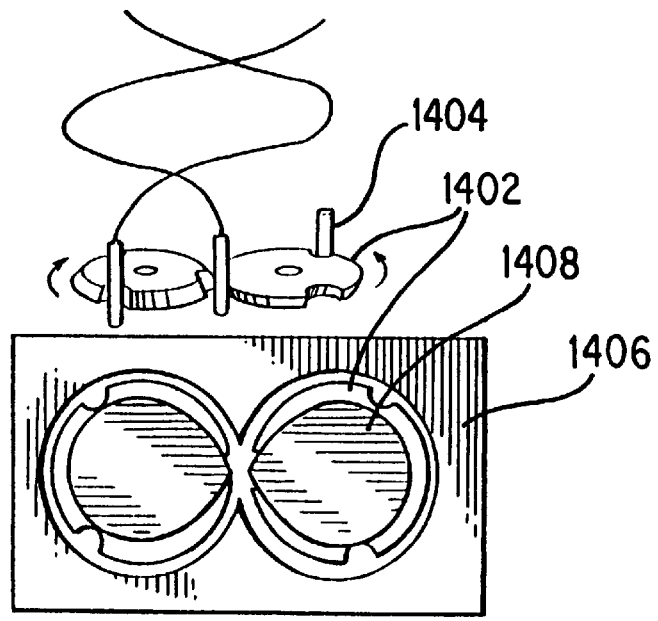
FIG. 14 shows a Soutache braider used to form a 3-braid line.
Figure 15:
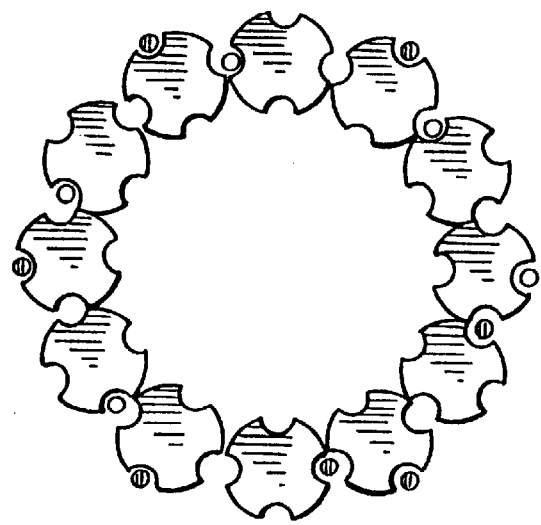
FIG. 15 shows a Maypole braider with 12 horngears and 12 bobbin carriers.
Figure 16:
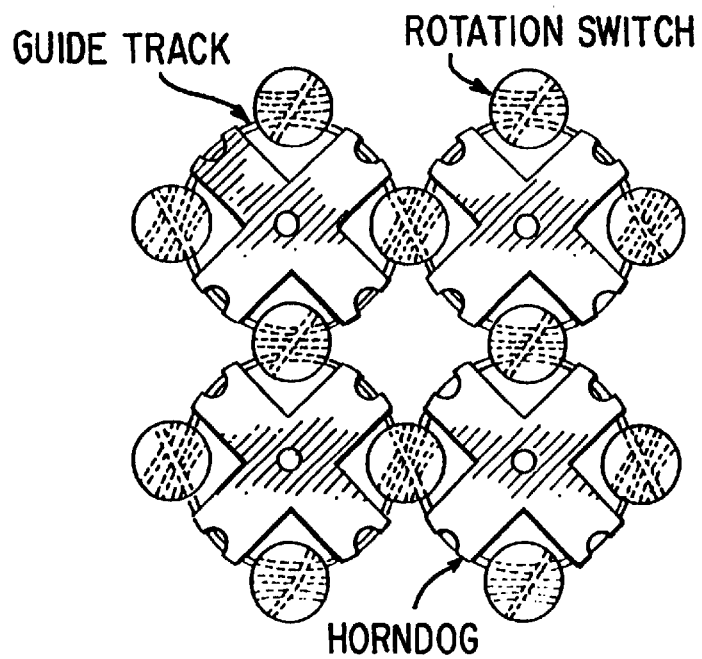
FIG. 16 shows a 3-D rotation braider.
Figure 17:
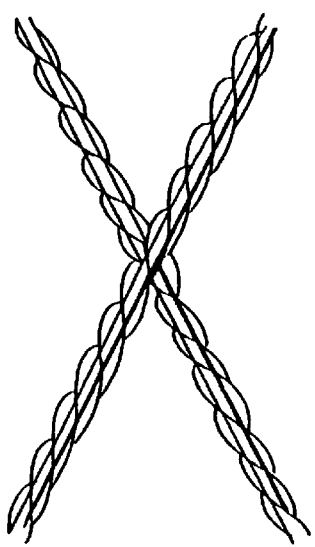
FIG. 17 show an Ultracross knotless net interconnection.
Figure 18:
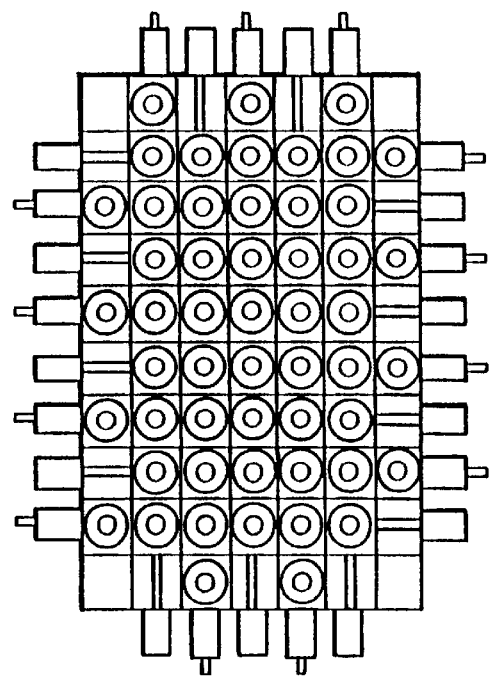
FIG. 18 shows a 4-step 3-D braiding machine.

Braiding is a textile process in which three or more yarns are intertwined to form an integral structure. An example of one of the simplest mechanical braiders, a "Soutache" 3-braider, is shown in FIG. 14. The braider consists of a set of "horndogs," 1402, which are slottled discs that propel bobbin carriers 1404 around tracks 1406 in guide plates 1408. Conventional 2-D braiding mechanisms create flat tapes or single-line tubular structures. To create complex net structures like the Hoytether, in which several separate lines are formed and periodically interbraided, requires 3-dimensional braiding capacity. Several different 3-D braiding technologies have been developed including the Herzog 3-D rotation braider, the 4-step 3-D braider, and the shuttle plate braider. FIG. 15 shows a Maypole braider. FIG. 16 shows a 3-D rotation braider. FIG. 17 shows an Ultracross knotless net interconnection. FIG. 18 shows a 4-step 3-D braiding machine. These technologies are well known to those skilled in the art. These technologies are capable of fabricating a wide range of complex structures. The machines, however, are quite complicated and are generally too slow to produce useable quantities of Hoytethers in a reasonable time.

1. EM Controlled 3-D Braiding

Figure 20A:
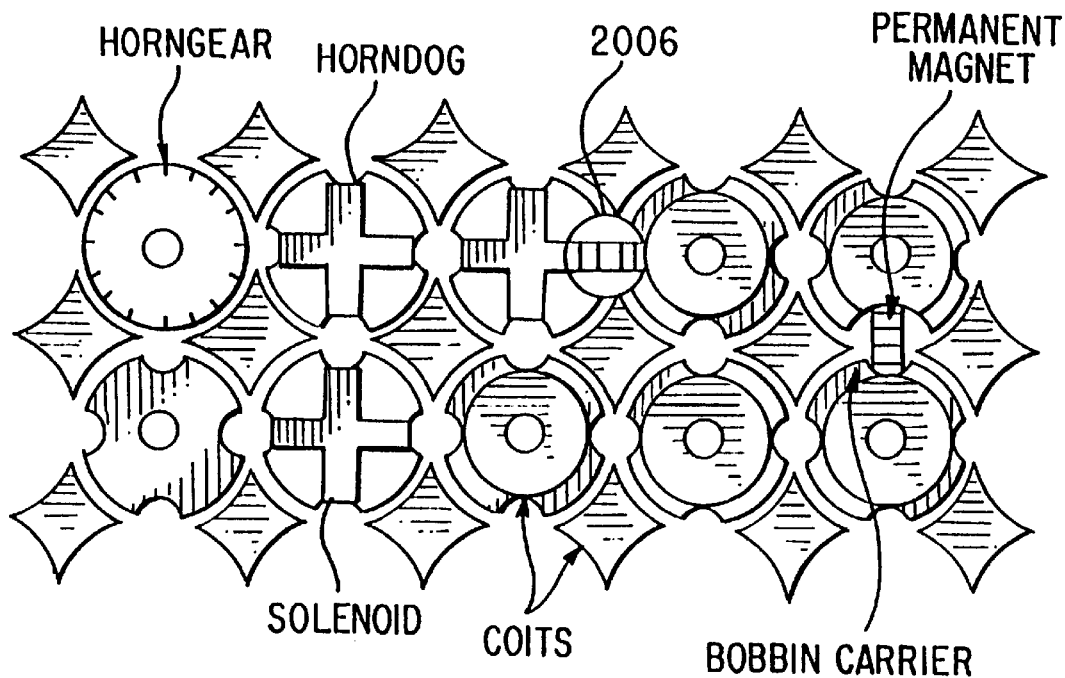
FIG. 20a is a top view of a EM controlled 3-D braider with electromagnetic control of bobbin carrier motion.
Figure 20B:
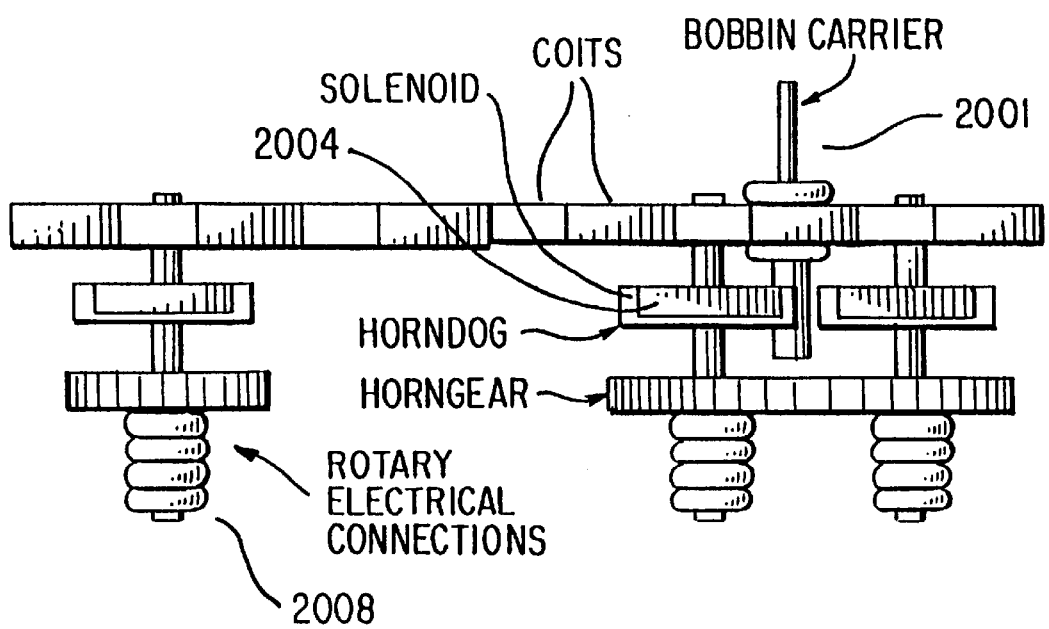
FIG. 20b is a side view of FIG. 20a showing the rotary electrical connections.

In this method, shown in FIG. 20a, the motion of the bobbin carriers 2001 in a braiding machine are controlled by the use of electromagnetic solenoids 2004 inside the horndogs 2006. FIG. 20b also shows the rotary electrical connections 2008 needed by this method of line control.

2. Multiple Soutache with Interbraiding

In this method an exchange gear connects the Soutache pairs of a braiding machine. At intervals defined by the Hoytether design, the carriers forming one line is transferred across to the Soutache pair forming an adjacent line. The yarns for the two lines are then interbraided for any desired length. The connection has the form of a Soutache 3-braid where each component of the braid consists of a yarn from each line.

Figure 19:
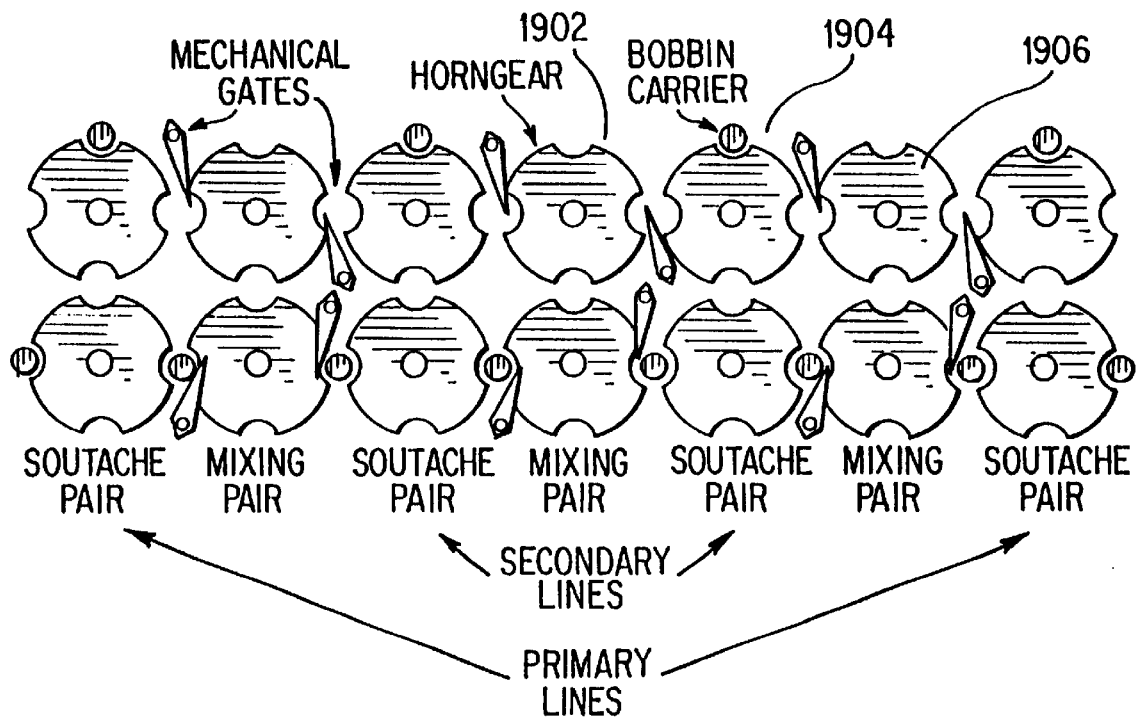
FIG. 19 shows a braider configuration for a Bi-line Hoytether.
Figure 21:
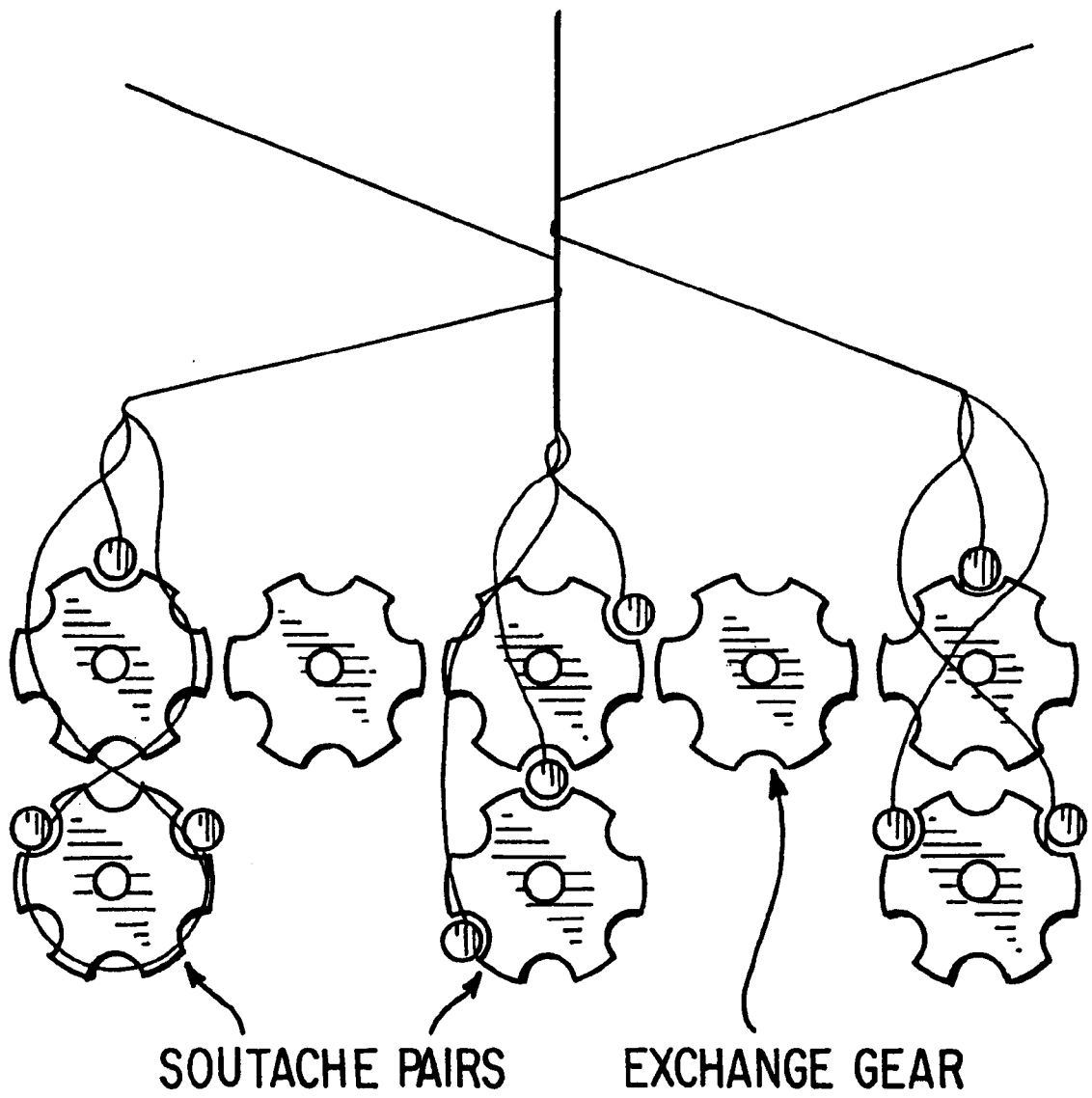
FIG. 21 is a schematic for multiple Soutache with inter-braiding using six slot horndogs and exchange gears.
Figure 22:
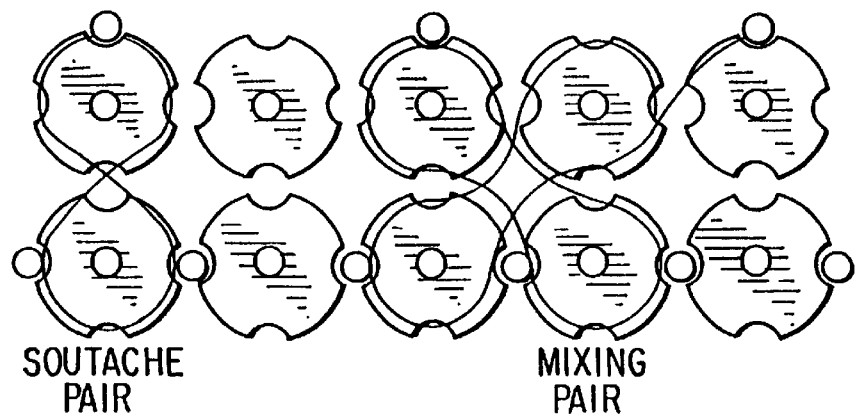
FIG. 22 is a schematic for multiple Soutache with inter-braiding using standard four slot horndogs.

A design for a braider capable of fabricating a bi-line Hoytether is shown in FIG. 19. This design has a 2×7 array of horngears. Mechanical gates separate these gears into seven pairs. Four of these pairs are used as conventional Soutache 3-braiders to fabricate two primary lines and two secondary lines. When the mechanical gates 1902 are actuated, the bobbins 1904 move across the other three "mixing" pairs 1906 to interbraid with the bobbins of adjacent Soutache pairs. The pattern that the bobbin carriers would follow to create the separate lines and the interconnection is shown in FIG. 22. A variation on this design is shown in FIG. 21 which uses horndogs with six slots.

3. Soutache Nodal Connections

In this method the primary and secondary lines are braided together to form modal connections, the lines are then pulled forwards and the process is repeated.

Figure 23:
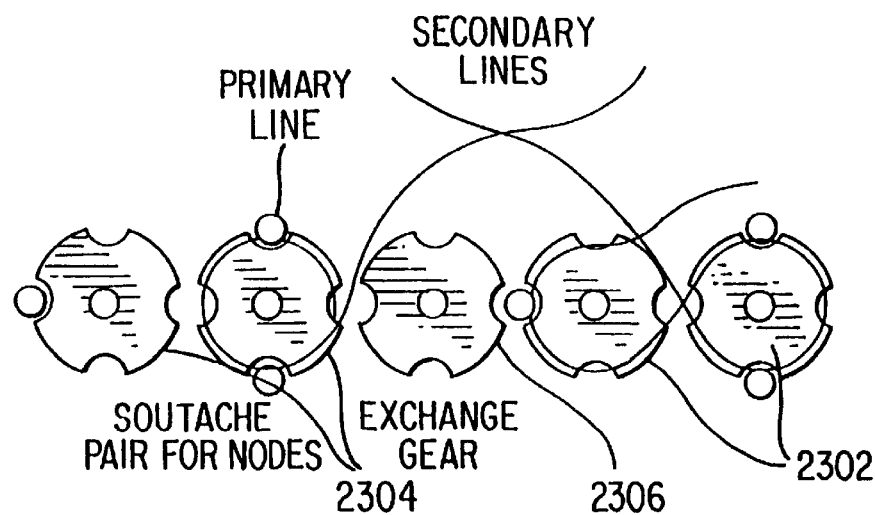
FIG. 23 is a section of a braider designed to form tri-axial nets by Soutache braiding the nodes.
Figure 24:
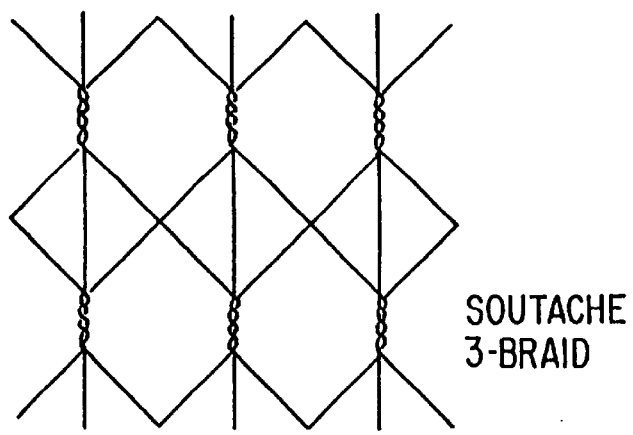
FIG. 24 shows Soutache 3-braid nodal connections.

As shown in FIG. 23 pairs of gears 2302 and 2304 are used to Soutache braid the primary and secondary lines together. A switching mechanism 2306 swaps secondary lines between adjacent Soutache pairs. The gears would then be halted and the desired length of the lines would be pulled off the bobbins. The gears would then be restarted to braid a new set of nodal connections, and the process would be repeated. This method could use standard 4-slot horndogs, but would require a switching mechanism such as mechanical gates or EM-controlled bobbins.

4. Twisted Lines with Interlocking

Figure 25:
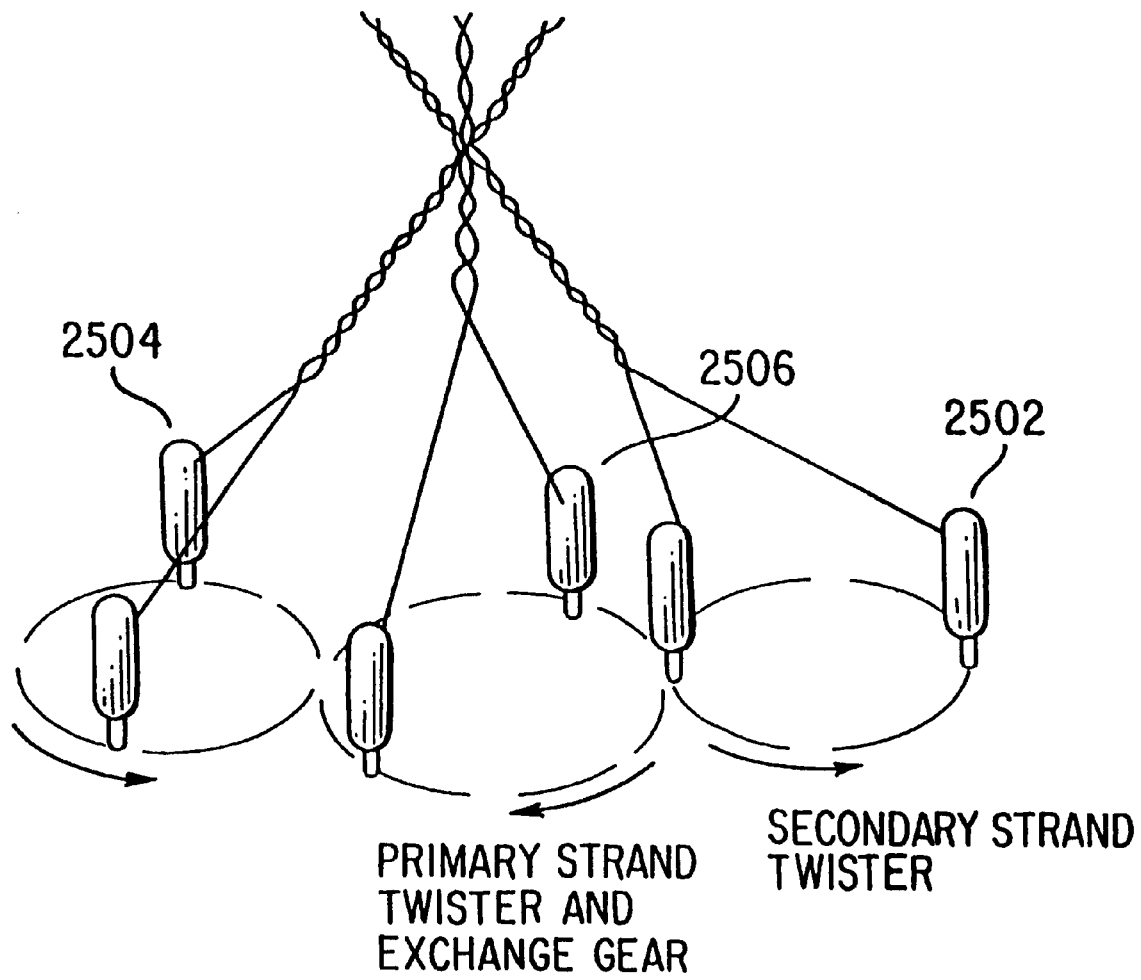
FIG. 25 shows twisted interlocked strand Hoytether fabrication.

In this method, shown in FIG. 25, each primary strand of the Hoytether is made by a group of three gears, with the secondary line bobbins 2502 and 2504, 90 degrees out of phase with each other and 45 degrees out of phase with the primary line bobbin 2506. The three-gear pattern would be repeated around a circle to make a tubular Hoytether or across a line to make a Hoytape.

5. Mechanism for Braiding Net Structures

This apparatus is a maypole-type braiding machine with the addition of mechanical gates to control the paths of the bobbin carriers so they can move both clockwise and counter-clockwise. The movement of these mechanical gates allows carriers from adjacent line pairs to intermix, forming a knotless interconnection between the two lines. The gates then return the carriers to their original pairs, and braiding of the separate lines continues.

C. Tether Deployment

1. Box Deployer

Figure 26:
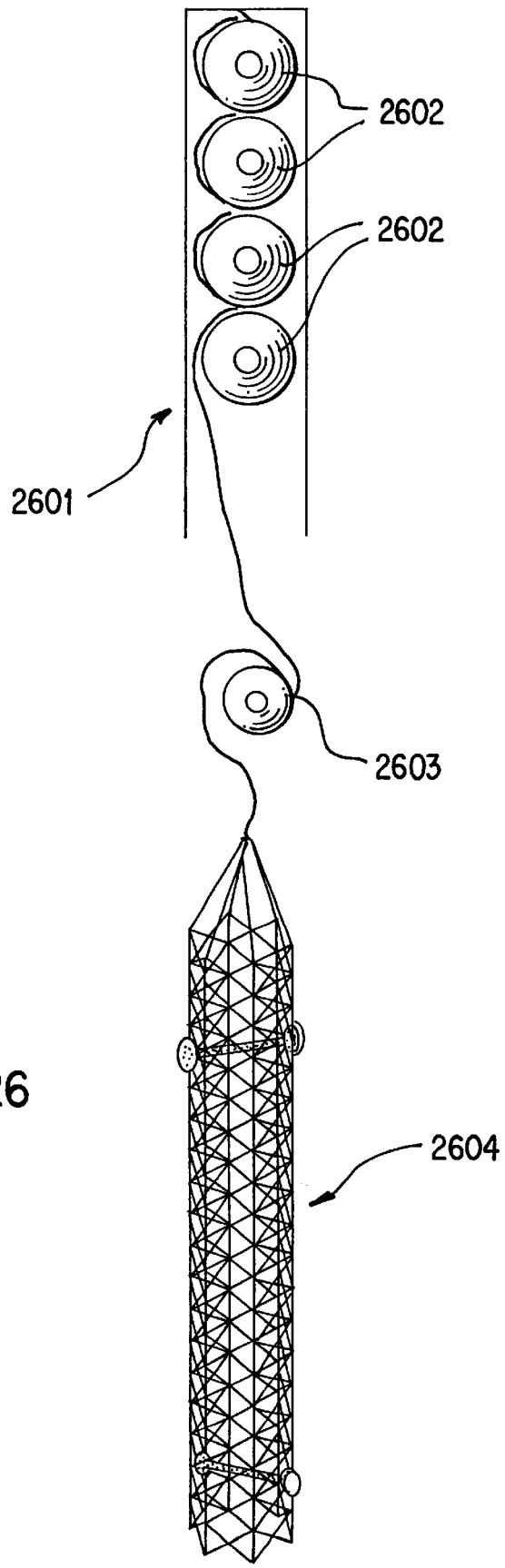
FIG. 26 shows a box deployer for Hoytether.

As shown in FIG. 26, a box 2601 contains multiple spools 2602. As the Hoytether 2504 unwinds from the spool it deploys from the box. Empty spools 2606 act as spacers to maintain primary line separation in the deployed Hoytether 2504.

2. Multiple Reel 'Curler Guide' Deployer

Although a flat Hoytape or a flattened cylindrical Hoytether can obviously be wound on a spool line reel as a flat ribbon, existing deployers are designed to work with cylindrical tethers. This deployer uses a curved guide plate structure that starts out flat at one end, so it is matched to the width of the flat Hoytether. One side of the guide plate is curled up more and more as the Hoytether moves through the guide, which causes the Hoytether to be rolled up from one edge. The curling continues for as many turns as desired, depending upon the thickness of the Hoytether, until at the other end the Hoytether emerges as a compact cylindrical spiral rolled tube. The guide plate may have raised edges or lips to keep the Hoytether centered during operation.

3. Magnetically Levitated Ring Spreader and Brake

Figure 27:
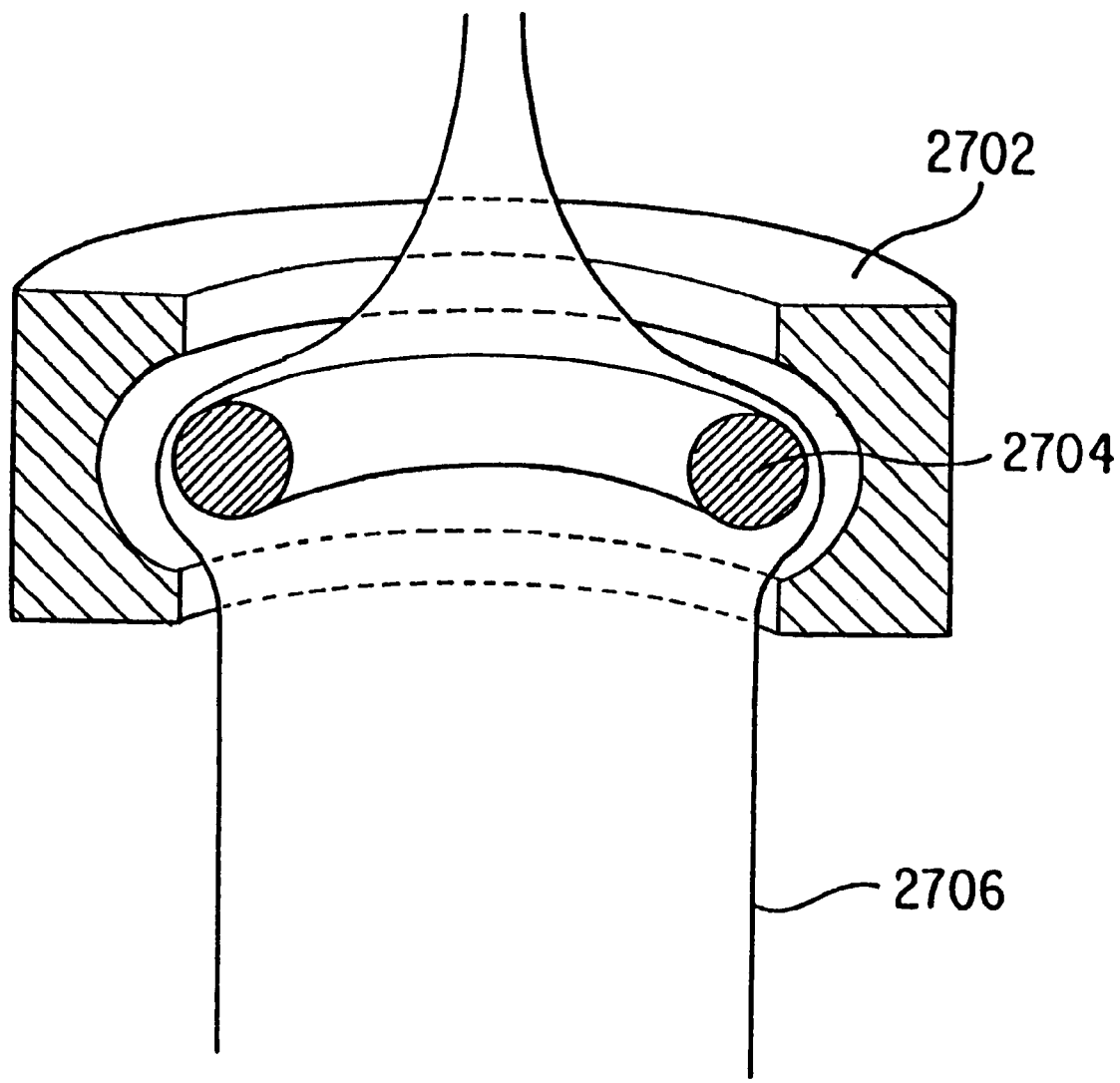
FIG. 27 shows a magnetically levitated Hoytether spreader deployer.

A magnetically levitated transducer 2702 shown in FIG. 27 is used to magnetically levitate a disk or a ring 2704 in the center of the Hoytether 2706 being unreeled from a deployer. The ring or disk enforces the diameter of the Hoytether at the deployer end at all times during the deployment. This can be combined with external roller or guides to produce a variable drag brake for the deployer.

4. Primary Line Separators

An important feature of the invention is the separation of the load bearing primary lines. This separation must be maintained to minimize the chances of a single impactor severing all of the lines. Encasing the lines in a plastic sandwich is one way to enforce this primary line separation. Flexible plastic spreaders could be periodically attached to the primary lines of the tether, flexible permanent magnets could be bonded to the primary lines, shape memory wires, such a nitinal wire, could be bonded to the primary lines, likewise inflated balloons could be placed inside the tethers.

5. Active Tension End Mass

An end-mass, such as a satellite or spacecraft part (burnt out upper stage, expended solar panels, or some convenient mass) is usually connected to the end of the tether. To understand why a Hoytether might require an end mass, it is necessary to know something about tether dynamics.

In order to understand the forces that cause the a tethered satellite to move upward and away from an orbiting satellite, for example, it is first necessary to explain briefly how a satellite remains in orbit. An orbiting satellite is acted on by the force of gravity, which pulls it toward Earth, and by a centrifugal force, which pushes it away from Earth. The centrifugal force" (actually inertia) results from the motion of the satellite around its circular orbit. This is the same force that one can experience by swinging a ball around on the end of a string. A satellite is maintained in its orbit when it travels at the natural speed for its altitude and, as a result, the centrifugal force is equal to the gravitational force.

At the orbital altitude for TSS-1R mission, for example, a speed of approximately 7.6-km per second is required to create sufficient centrifugal force to balance gravitational attraction. If the altitude is changed, the two opposing forces will no longer be in balance unless the Shuttle also changes its speed. A higher orbital altitude requires a slightly lower speed so the higher satellite will take longer to complete an orbit. Because of this, if two free-flying satellites are in orbits at different altitudes, the lower satellite will circle the Earth in less time than the satellite in the higher orbit.

If two satellites, at different altitudes, are connected to each other by a tether, they are forced to travel around their orbits together—in the same period of time, which is longer than the natural period of the lower satellite but shorter than that of the upper satellite. The lower satellite will, therefore, slow down below the natural speed for its orbit and will tend to fall to a lower orbit because the centrifugal force will now be less than the gravitational attraction of the Earth. An upward force in the tether that makes up the difference between centrifugal and gravitational forces holds it in place, however.

Correspondingly, the upper satellite will be accelerated above its natural orbiting speed (increasing its centrifugal force above the gravitational attraction) and will tend to move to a higher orbit. It, too, is held in place by an additional force (downward) in the tether. In other words, the net force downward on the lower satellite is balanced, through the tether, by the net force upward on the upper satellite. The effect of unbalanced forces on the two satellites is, therefore, to create tension in the tether. The satellite's inertia causes the Tethered Satellite System satellite to rise above the orbiter as the tether is reeled out. Very close to the orbiter, there is little difference in the two orbits, and the tension force is insufficient to overcome friction in the deployer mechanism; therefore, until the satellite reaches a separation of approximately 1000-meters, the tension is augmented by small tether-aligned thrusters on the satellite. Beyond this point, the tension in the tether is the only force required.

By experimenting with a ball hung on a piece of elastic cord (a paddleball, for example) it is possible to simulate all the different types of oscillations that are possible on a space-based tether system. The elastic cord, representing the tether, may compress and stretch, causing the ball to bounce up and down (longitudinal oscillation). It also may move in a circular (skip-rope) motion or may develop wave-like motions (transverse oscillations). Even if the string itself is not moving much, it is possible to get the ball rocking back and forth about its attachment point (pendulous motion).

Each type of motion occurs with a particular frequency, which depends on the length and tension of the tether. When the frequencies are different, the motions do not interact; however, at some tether lengths, the frequencies of two or more types of oscillation can become very close. At this point, energy can be transferred from one type of motion to another, a phenomenon known as resonance. For instance, the transverse oscillations in the tether may cause the satellite to rock back and forth in pendulous motion.

Many different factors may cause oscillations; the movements of the satellite or Shuttle are but two of these. For an electrodynamic tether, the skip-rope oscillations are of particular interest. As the system produces an electrical current, it also produces a magnetic field around the tether. This magnetic field will interact with Earth's magnetic field, resulting in a force that may produce skip-rope oscillations. Because it is necessary to maintain control of the satellite, much study has gone into identifying the different types of possible motions and the methods used to control them.

One way to control the magnitude of these motions is to have an end mass connected to the Hoytether that maintains a controlled tension on the tether, working much like a spring-loaded 'dog leash'. This may be as simple as a coiled spring, or as complex as a active control system that measures forces on the tether and adjusts the applied tension according to a local or remotely operating algorithm.

Industrial Applicability of Tether Systems
1. Electrodynamic Tethers

Electrodynamic tether propulsion is unlike most other types of space propulsion in use or being developed for space application today—there is no hot gas expelled to provide thrust. Instead, the environment of near-Earth space is being utilized to propel a spacecraft or upper stage via electrodynamic interactions.

A charged particle moving in a magnetic field experiences a force that is perpendicular to its direction of motion and the direction of the field. When a long, conducting tether is flowing current (charged particles), they experience this force due to the fact that they are moving along the wire in the presence of Earth's magnetic field. This force is transferred to the tether and to whatever the tether is attached (like a spacecraft, satellite, space station or upper stage). It can be an orbit-raising thrust force or orbit-lowering drag force, depending upon the direction of current flow. Operation in one mode allows boost from LEO to higher orbit while reversing the current flow provides negative thrust for deboost. The principle is much the same for an electric motor; reverse its operation and it acts as a generator. Current is obtained from the ionosphere with collection and emission occurring on opposite ends of the tether.

Uses of an electrodynamic tether as its orbit raising and lower propulsion system has many advantages over competing systems:

a. It is nearly propellantless. Most other systems expel hot gases and require extensive resupply. To emit current, the electrodynamic tether propulsion system will likely use plasma contactors developed as a part of the International Space Station Program. These contactors consume less than 20 kg of xenon gas per year with a 50% duty cycle.

b. It can change both altitude and inclination. The Earth's magnetic field is non-uniform and can therefore provide both in- and out-of-plane forces for inclination changes as well as altitude changes. This is of particular interest to payloads requiring polar orbits in that they can be launched on a small launch vehicle into a lower inclination orbit and have it raised in space by the proper phasing of current through the tether.

A demonstration of the propulsive capabilities of electrodynamic tethers was recently approved for flight in 1999. The Propulsive SEDS mission, or ProSEDS, will fly as a secondary payload on a Delta II launch vehicle and deploy a 5-km conducting tether using the existing SEDS deployer concept.

NASA is studying the feasibility of tapping electrical energy from the International Space Station's reservoir of orbital energy by means of an electrodynamic tether attached to the station. The proposed system uses a tether with a kilometers long uninsulated segment capable of collecting currents greater than 10 Amperes from the ionosphere, to provide six kilowatts of continual power to the station.

Figure 28A:
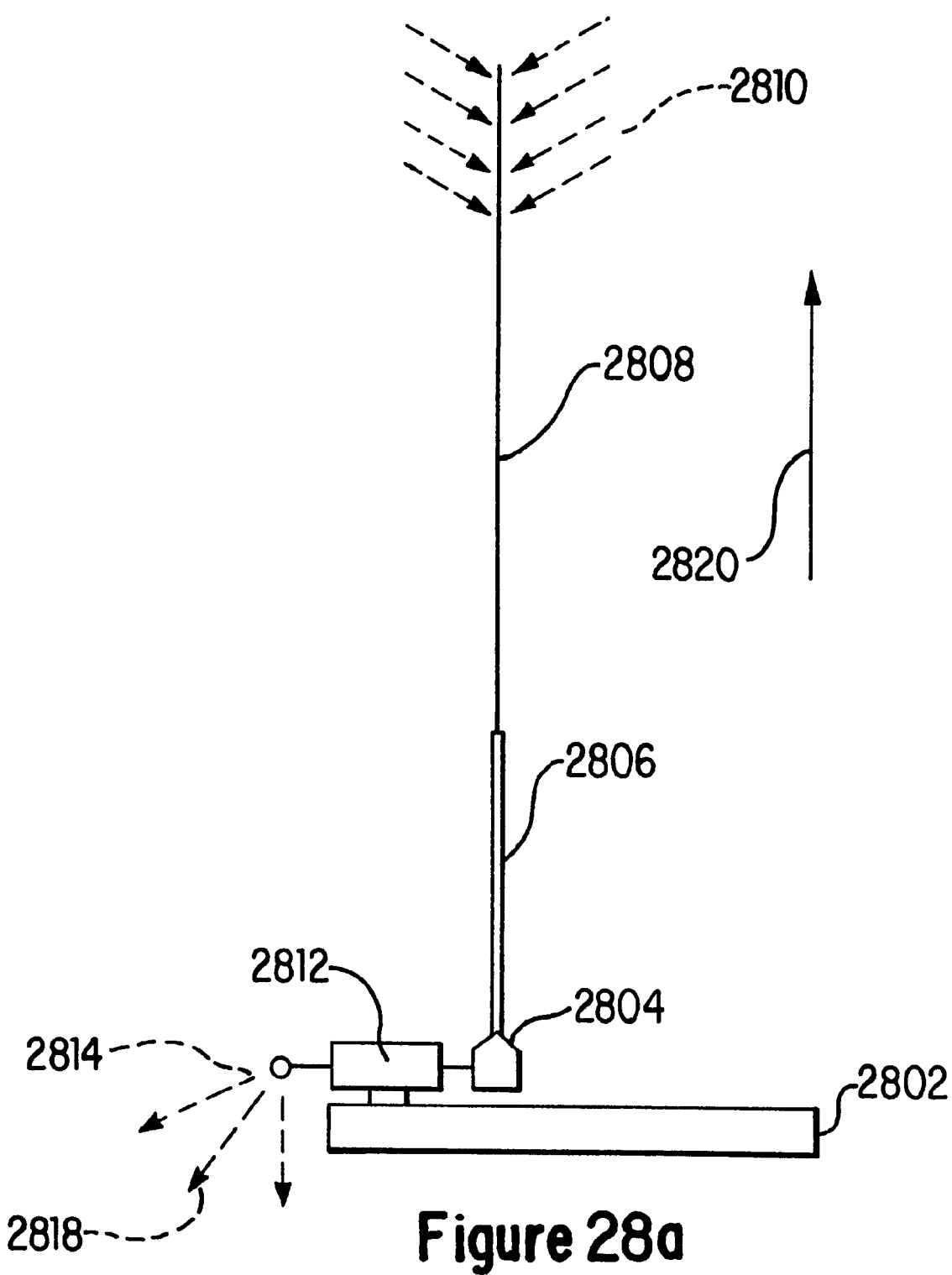
FIG. 28a shows a schematic block diagram of a electrodynamic tether system.

FIG. 28a generally shows the arrangement of functional elements of an electrodynamic tether system. Of course such a system must have a means of attachment to the spacecraft, a deployer, the tether itself, some form of cathode contactor, some form of anode contactor, a power dissipation system, and a communication and control system. These elements lie in the well known art of aerospace engineering. But some of the tether specific system elements must be detailed.

In FIG. 28a, a space object 2802, i.e. the International Space Station 'Alpha', or another space object either natural or man made, is physically connected to the tether system. This system comprises a deployer 2804 from which a conductive Hoytether 2806 having a bare segment 2808 extends upward from the space object. The positively biased anode end 2810 of tether 2806 collects electrons from the ionosphere. These electrons flow through the conductive structure of the Hoytether to the power system interface 2812, where it supplies power to the load, not shown. The electrons then flow to the negatively biased cathode 2814 where electrons are ejected into the space plasma 2818, thus completing the electric circuit.

2. Electrodynamic Drag Terminator Tethers

One application for long-life conducting electrodynamic tethers with is as a "terminator tether" for removing from orbit unwanted Earth orbiting spacecraft at the end of their useful lives. When the mission of the satellite is completed, the terminator tether, weighing a small fraction of the mass of the satellite, would be deployed. The electrodynamic interaction of the conducting tether with the Earth's magnetic field will induce current flow in the tether conductor. The resulting energy loss from the heat generated by the current flowing through the ohmic resistance in the conducting tether will remove energy from the spacecraft, eventually causing it to deorbit, thus reducing the amount of orbital space debris that must be coped with in the future. In this preliminary analysis, it is shown that the amount of energy loss generated by an electrodynamic tether is essentially independent of its length or area, and instead is primarily proportional to the tether mass and the physical properties of the conductor metal chosen. In the typical example calculated, a 1000-kg spacecraft can be deorbited from a 1000-km high Earth orbit by a 10-kg mass tether in a month, while a 1-kg tether can deorbit a 1000-kg spacecraft in less than a year.

Joseph P. Loftus of NASA/JSC proposed the general concept of using an electrodynamic tether to deorbit spent satellites. Loftus was motivated by the NASA Safety Standard NSS 1740.14, which gives the NASA safety guidelines for future missions. The Safety Standard requires that spacecraft in LEO be removed from orbit by active means or atmospheric drag within 25 years after completion of their mission. Loftus was considering the use of electrodynamic drag from a conducting tether to achieve this goal of bringing the unwanted spacecraft down from its high orbit (where atmospheric drag is negligible) to a 200-km orbit, where atmospheric drag would rapidly finish off the task of removing the unwanted spacecraft from orbit. The tether Loftus was considering was a single-line, conducting tether, typically 1-mm in diameter, 1-km long, and, if made of aluminum, 2-kg in mass. He would include means at the ends of the tether to contact the ambient space plasma around the Earth to complete the current loop.

Unfortunately it is probable that space impactors would sever the 1-mm diameter, 1-km long single-line tether proposed by Loftus within a 1/e lifetime of four months. This would produce orbital debris rather than removing it. The Terminator tether concept would be greatly improved by using a long-life conducting wire Hoytether, for not only would the tether stay intact during the deorbit process, but, by constructing a flat Hoytether with a large number of interconnected lines, the plasma contact area of the Hoytether, especially at the ends, could be increased to many tens of square meters, thus insuring sufficient current flow between the 'bare wire' Hoytether and the ambient space plasma without having to use complicated electronic or exotic chemical 'contactors'.

It was also found that a few kilograms of conductive Hoytether can easily deorbit a multi-ton spacecraft within a month to a few years, depending upon initial conditions. It should be noted that this technique will not work for spacecraft in geosynchronous orbit, as they do not move across the magnetic field lines of the co-rotating Earth.

a. NASA Safety Standard

The motivation for this work is the NASA Safety Standard NSS 1740.14 "Guidelines and Assessment Procedures for Limiting Orbital Debris." The relevant portion of the Standard starts on page 6-3: General Policy Objective—Postmission Disposal of Space Structures. Item 6-1: "Disposal for final mission orbits passing through LEO: A spacecraft or upper stage with perigee altitude below 2000 km in its final orbit will be disposed of by one of three methods." The method of interest relevant for this analysis was the atmospheric reentry option, Option a: "Leave the structure in an orbit in which, using conservative projections for solar activity, atmospheric drag will limit the lifetime to no longer than 25 years after completion of mission. If drag enhancement devices are to be used to reduce the orbit lifetime, it should be demonstrated that such devices will significantly reduce the area-time product of the system or will not cause the spacecraft or large debris to fragment if a collision occurs while the system is decaying from orbit."

The NASA standard applies only to NASA spacecraft and even then only to completely new spacecraft designs. New versions of existing designs are to make a "best effort" to meet the standard, but will not be required to change their design to do so. The Department of Defense has adopted the NASA standard with the same provisos. An Interagency Group report has recommended that the NASA standard be taken as a starting point for a national standard. It is NASA's recommendation to the Interagency Group that the safety requirement be phased in only as we reach consensus internationally, which is being done through the International Debris Coordination Working Group whose members are Russia, China, Japan, ESA, UK, India, France, Italy, and the US.

Thus, although the NASA Safety Standard in its present form is not the "Law", the existence of the standard means that some time in the future a similar requirement may be imposed on all spacecraft. This could result in major growth in future space tether business, with a sale to every non-geostationary spacecraft being "mandated" by government safety regulations, somewhat as the sale of seat belts and airbags for every car are mandated.

b. Electrodynamic Tether Interaction

When an Earth orbiting conducting space tether moves through the magnetic field of the Earth, an electromotive force (emf) per unit length e is generated in the tether that is proportional to the velocity of the conductor, the magnetic field strength of the Earth, and the angle between the conducting tether and the magnetic field lines. From data obtained during the various electrodynamic experiments that have been conducted in space to date, such as the PEG, TSS-1, and TSS-1R experiments, a typical value of the generated emf per unit length of tether of e=100V/km can be assumed. The electric potential E developed at the ends of a tether of length L is then $E=eL$. For a tether of length $L=10$ km, the electric potential developed is $E=1000$ V. For calibration, the 20-km long TSS-1R tether, at the moment of failure, was developing a potential of 3500 V, which is 175V/km.

The mass of a conducting tether of length L, cross-sectional area A, and density d is given by $m=dLA$. Typical values for the density are $d=2700$ kg per cubic meter for aluminum and 8900-kg per cubic meter for copper. For a typical aluminum tether of mass $m=10$-kg and length $L=10$-km, the cross-sectional area will be $A=0.37$ mm squared. If this were a solid-wire single-line tether, the diameter of the wire would be $D=0.69$-mm (21.5 gauge). If this were an 18 line tubular Hoytether, the diameter of the lines in the Hoytether would be $D=0.16$ mm (34 gauge).

The resistance of a conducting tether of length L and cross-sectional area A is given by $R=rL/A$, where r is the resistivity of the conductor in nano-ohm-meters (nW-m). Typical values for the resistivity are $r=27.4$-W-m for aluminum and 17.0-nW-m for copper. For our $m=10$-kg aluminum tether of length $L=10$-km and cross-sectional area $A=0.37$-mm squared at 20 degrees C., the end-to-end resistance is 750 W. This value of resistance is the essentially the same whether the conductor area is concentrated into a single-line tether or divided up into many lines as in a multiline Hoytether.

The current I generated in the conducting tether by the electric potential E between the ends of the tether applied across the tether resistance R is $I=E/R$. For the 10-kg mass aluminum tether of length $L=10$-km, electric potential $E=el=1000V$, and resistance $R=750$ W, the current is $I=E/R=1.33$ Amps. Currents near these values were seen in the TSS-1R experiment at the time of failure. Since, at the time of failure, none of the plasma contactors on the Space Shuttle or the Italian Satellite were operating, that means that the current was being collected by the conductive surface area of the Space Shuttle and the Italian Satellite at the two ends of the tether. The Space Shuttle area is quite large so it was not the limiting factor in current collection. The diameter of the Italian Satellite was 1.6 m, which would give it an effective plasma contact area of about 8-m squared. This shows that, if the plasma contact area of the ends of a conductive space tether can be make large enough, then ampere level currents can be extracted from the ambient space plasma.

If the Terminator tether is properly designed so that it has a large plasma contact area at the ends (for example, by using widely separated multiple lines as would be found in a multiline Hoytether), then there should be no problem in obtaining ampere level currents from the ambient plasma in the space around the tether even at high altitudes. If it is later found that the current levels are too high for the space plasma to cope with, then lengthening the tether or decreasing the mass of the tether will increase the tether resistance, and the current levels will drop proportionately to values that can be supported by the space plasma. It will ultimately be this optimization that will determine the final L/A aspect ratio or shape of the tether.

The power dissipated as ohmic heating in the tether is given by $P=IE=E2/R=I2R$. Substituting in the formulas for I, E, and R, we obtain the relation $P=e2m/rd$. Thus the power dissipated does not depend upon the length or the area of the tether (within reason), but only the mass of the tether m, the resistivity r and density d of the tether material, and the emf per unit length e generated by the motion of the conductor through the Earth's magnetic field. For an aluminum tether of mass $m=10$ kg, resistivity $r=27$ nW-m, and density $d=2700$ kg/m cubed, subjected to an emf of $e=100V/m$, the power dissipated in the ohmic losses of the conductor is $P=IE=1330$ W. For a 1-kg mass tether, it would be still a considerable 133-W of dissipation.

There will no doubt be additional dissipation of energy in plasma ohmic losses, plasma wave generation, and plasma ion acceleration, but the ohmic losses in the conducting tether alone are sufficient for the task of deorbiting an unwanted spacecraft massing 100 to 1000 times more than the tether.

The decay time of a metric ton spacecraft moving from a 1000 km altitude orbit to a 200 km altitude orbit with an energy difference of $dU=3.3$ GJ, when its energy is being dissipated at a power of $P=1330$ W by an aluminum tether massing just 10 kg, or 1% the mass of the spacecraft, is about one month. This is a remarkably short time, and indicates that the concept is indeed feasible. If the aluminum tether massed only 1 kg, or 1/1000th the mass of the spacecraft it was deorbiting, then the decay time would rise to 10 months, still a reasonable value.

In reality, of course, the actual decay time will be longer than this. If the electrodynamic drag force is very large, and becomes larger than the gravity gradient forces pulling on the ends of the tether (which force is proportional to the mass of the tether), then the tether will tend to align itself along the magnetic field lines instead of across them, and the drag force will decrease because of the small angle between the conductor length and the magnetic field lines. The tether will then settle into an angle determined by the balance between these two forces.

The basic optimum structure for a Terminator tether would be one of the many types of Hoytethers. A multiline (6–12 primary line) Hoytape would give the largest contact area with the plasma, since both sides of the tape would be able to pass current to the plasma. If the spacing between the primary lines were made roughly twice the radius of the plasma contact volume that builds up around the wire, then the effective current collection area per unit length of the Hoytape is proportional to the width of the Hoytape mesh, not the diameter of the wires in the mesh. Thus, a Hoytape not only provides an assured longer life for the Terminator tether, but very short lengths can give very large current collection areas. For example, if the Hoytape mesh were 25 cm wide, then just 16 m of tether has an area of 8 square meters, which was the current collection area of the Italian Satellite, that drew over an ampere of current out of the space plasma. Thus, using the Hoytape concept instead of a single wire, will allow for the tether to be very short, perhaps limited mostly by the desire to have enough length interacting with the magnetic field of the Earth to produce sufficient voltage to make the system operate reliably. Since one kilometer of tether length typically produces 100 V between the two ends, one could consider going to a quarter of a kilometer or roughly the 24 volts direct current power that is often used by the electrical systems of satellites. The current required to generate 100 watts of power would be four amperes.

The deployer for the tether can deploy the Terminator tether either down or up or both. The deployer can stay attached to the spacecraft as was done in the SFDS missions, or perhaps a better alternative would have the deployer ejected from the spacecraft, with one end of the tether still attached to the spacecraft, reeling out tether as it leaves. The empty deployer would then be a weight at the end of the Terminator tether, which would improve its performance.

In addition to attaching Terminator tethers to spacecraft before launch, it is possible to consider a Terminator Missile application. This would use a Terminator tether carried by a small seeker missile of the "hit-to-kill" variety developed by SDIO that deployed a net loaded with metal rods. The missile would hunt down a spacecraft that needs to be removed from space, but instead of hitting the spacecraft, the missile would be programmed to rendezvous with the spacecraft, attach itself to the spacecraft using a hooked net or a harpoon, then deploy the Terminator tether, which would then bring both the spacecraft and the missile down.

The terminator tether system will require means of emitting and collecting currents to and from the ambient space plasma. At the anode end (the end of the tether biased positive relative to the ambient plasma), a means must be provided for emitting positive current by collecting electrons from the ambient plasma and/or emitting ions. At the cathode end (the end of the tether biased negative relative to the ambient plasma), means must be provided for collecting positive current by collecting ions from the ambient plasma and/or emitting electrons.

The anode contactor system will emit positive current collecting electrons from the ambient space plasma and/or emitting positively charged ions. This can be a bare wire tether, a plasma contactor, self-powered plasma or electron emitters, or a neutral gas source (for example, a gas reservoir in the end mass or on the spacecraft, hydrogen gas soaked palladium or similar metal, or other gas soaked porous volume conductors.).

The cathode contactor system will collect positive current from the ambient space plasma. This may be accomplished by a number of methods:

Thermionic emission. Electrons may be emitted from a surface that is heated so that a significant portion of the electrons have enough thermal energy to overcome the surface work function. The voltage on the cathode end of the tether will then accelerate the electron away from the tether. The emission surface would be heated resistively, with power provided either by the satellite power system or by the generated tether power.

Plasma contactor. A plasma contactor such as a hollow-cathode plasma contactor can be used to ionize a gas. This gas can either be supplied by the contactor system or could be supplied by the ambient atmosphere. The ionized gas forms a plume of relatively high-density plasma near the contactor. This plasma plume provides a low impedance connection to the dilute ambient plasma thorough which electrons can be emitted to the space plasma.

Secondary emission. Electrons can be emitted to the ambient space plasma by the process of secondary emission. The cathode end of the tether will be charged at large negative voltages (hundreds or thousands of volts) relative to the ambient plasma. Surfaces a the cathode end of the tether will thus attract ions from the ambient plasma and these ions will impact the surfaces with high kinetic energies. If their kinetic energy is sufficiently large, these ions will kick one or more electrons out from the surface.

Photoemissive surfaces. Current can be collected from the ambient plasma by using sunlight to emit electrons from photoemissive surfaces. Metals, alkali metals, and many semiconductors will emit electrons when subjected to photons of sufficient energy. The photon energy required and the quantum yield vary greatly depending upon the material comprising the photoemissive surface.

Field emission. Electrons can also be emitted from a surface by field emission effects. When voltages are applied to structures with sharp corners, strong field gradients near these corners can cause large electric fields which can either pull electrons out of the surface or ionize atoms near the surface. One structure would be a very fuzzy wire, so that many sharp ends stick out from the surface.

One way to control the deployment of a terminator tether would be to measure the temperature of the satellite. When the satellite stops working, it gets cold. The drop in satellite temperature would cause the tether to deploy, which automatically removes the defective or spent satellite from orbit.

Is the terminator tether theoretically a better means than atmospheric drag or a rocket engine for deorbiting satellites at the end of their useful life?

In the formula for da/dt (change in altitude per change in time), using the assumptions of near-circular spiral trajectories, that $$A \int dt = -\frac{m}{C_D} \int \frac{da}{\rho(a)\sqrt{\mu a}},$$

where p(a) is simply the density as a function of semi-major axis. Thus, for a static atmosphere, the problem of area-time product is reduced to quadrature. Note that the area-time product depends only on the density profile and the ratio of spacecraft mass to drag-coefficient and is linearly related to that ratio.

The basic altitude-dependence of the atmospheinc density, represented here by p(a) can be expressed in a low-order power series of ln(density)=f(ln(altitude)), so that we can develop a representation of the log-log relationship between altitude and density. The three static levels of atmospheric density are modeled as 5th order polynomials in the natural log of the altitude and are representative of the models of Ref. 1. The values of exospheric temperature are reasonable (about 2-sigma) high and low solar activity values of 1400 and 800 kelvins respectively. The mean value is taken to be 1100 kelvins.

Figure 28B:
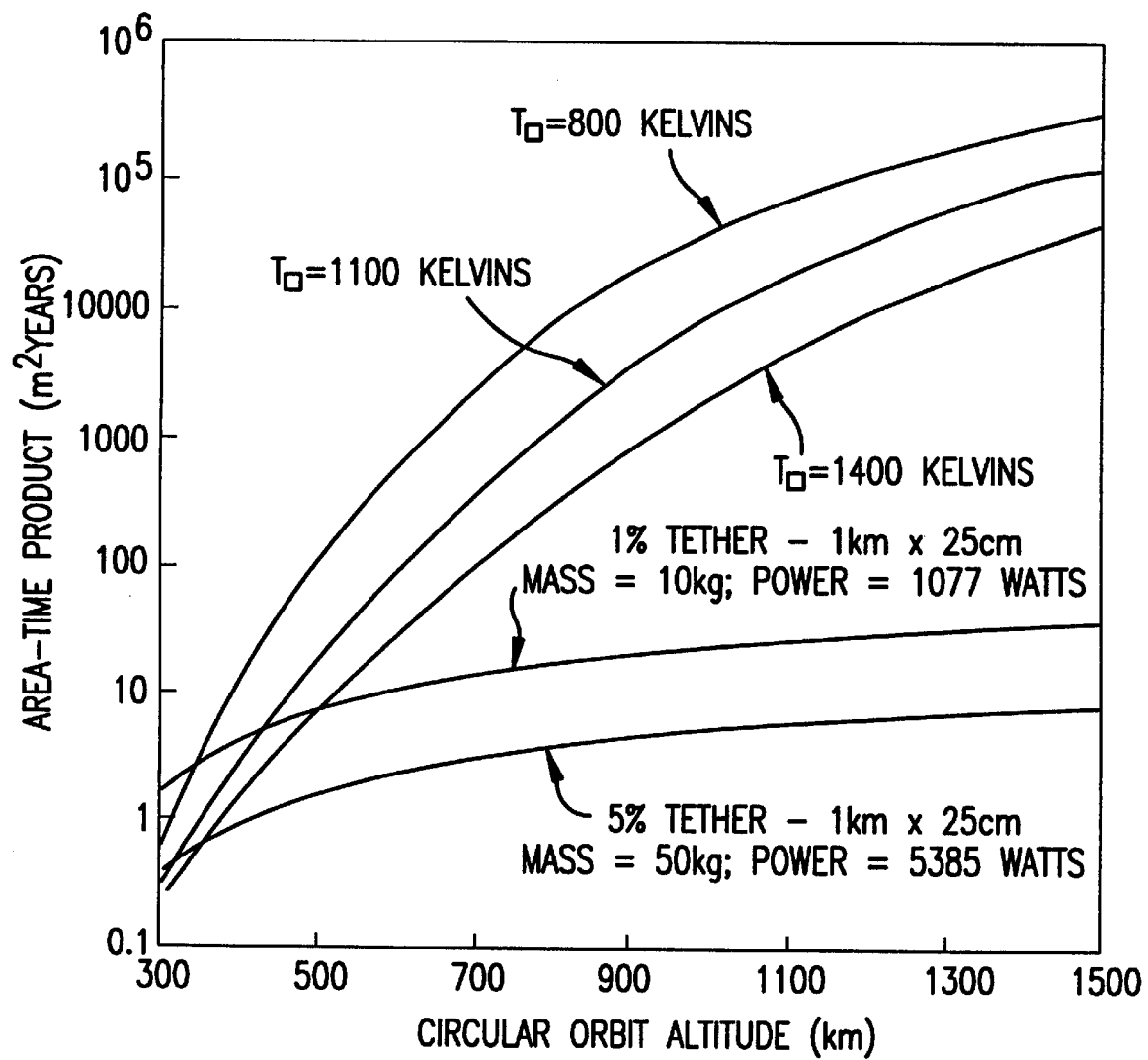
FIG. 28b shows a graph of the time area product of the electrodynamic tether system.

FIG. 28b shows a graph of the Area-Time product for three separate levels of exospheric temperature (for neutral drag calculations) and for two separate assumptions regarding tether mass and power drawn from the ambient plasma (for the terminator tether calculations). The density profiles for the three values of exospheric temperature represent the extremes and mean values to be expected during the next several decades. The exospheric temperature goes through a cycle of about an 11 year period with maximum about 1400 kelvins and minimum about 800 kelvins (References: 1. Jacchia, L. G., "Thermospheric Temperature, Density, and Composition: New Model," SAO Special Report 375, March 1977. 2. Anon., Marshall Space Flight Center, "Long-Range Statistical Solar Activity Estimation," Atmospheric Sciences Division, 1989.)

The tether calculations include an inherent assumption that the Terminator tether transfers all the energy extracted from the ambient space plasma into drag that decreases the orbital energy of the spacecraft at a rate given by the power drawn by the tether. Thus, the change in energy for a spacecraft of mass m is given by the expression $$\Delta E = -m\left(\frac{\mu}{2(R_e + at)} - \frac{\mu}{2(R_e + 250)}\right),$$

and the time required to effect this change in energy of the mass, m, is just delta $t$=delta $E/P$, where P is the power drawn by the tether from the ambient plasma charge. Note the assumption that all the power goes into changing the orbital energy and the convention that the energy is given in kg-km²/s². These quantities are converted into MKS units in the code shown in the appendix. The Area*Time product is given in m²-years.

The curves for 1% and 5% tethers do not include the effects of atmospheric drag because the electrodynamic drag is orders of magnitude greater than the neutral atmospheric drag. At altitudes greater than about 700 km, we can be confident that the electrodynamic drag is 200 to 3000 times greater than the neutral drag forces.

It is clear, from FIG. 28b that the terminator tether concept is far superior to neutral drag in removing spacecraft from orbit, no matter how much additional area is added to the passive spacecraft to increase the atmospheric drag. The analyst should note that FIG. 28b is proportional to mass; that is, the AΔt values should be multiplied by the mass of the spacecraft and divided by 1000 kg. This is true for the neutral drag and Terminator tether curves alike. The power levels assumed for the 1% and 5% tethers are only 80% of their theoretical values. This is done to provide a 20% margin on the power available from the ambient plasma and electrodynamic gradient.

Conventional rocket mechanisms can remove spacecraft from orbit. The discussion is short because this mechanism is apparently not viable from mass considerations when these factors are compared with the capabilities of the terminator tether.

Let us suppose that a satellite owner decides to satisfy the NASA safety requirements by adding a small solid motor and the associated hardware, software, sensors and structure to make the package independent, to be used to deorbit the spacecraft in case the main spacecraft power, attitude, or propulsion system fails.

The requirements of such a system are more stringent than those we attribute to ordinary spacecraft. They must operate when some or all other systems of the spacecraft have failed. These more stringent requirements are balanced by lesser requirements of performance. The backup system must simply deorbit the spacecraft; it does not have to perform all the other duties of the spacecraft. But the back-up system must know when to fire under all kinds of anomalous situations, including tumbling, offset of center of mass (because of loss of parts due to collisions), and lack of knowledge of the orbital position.

Figure 28C:
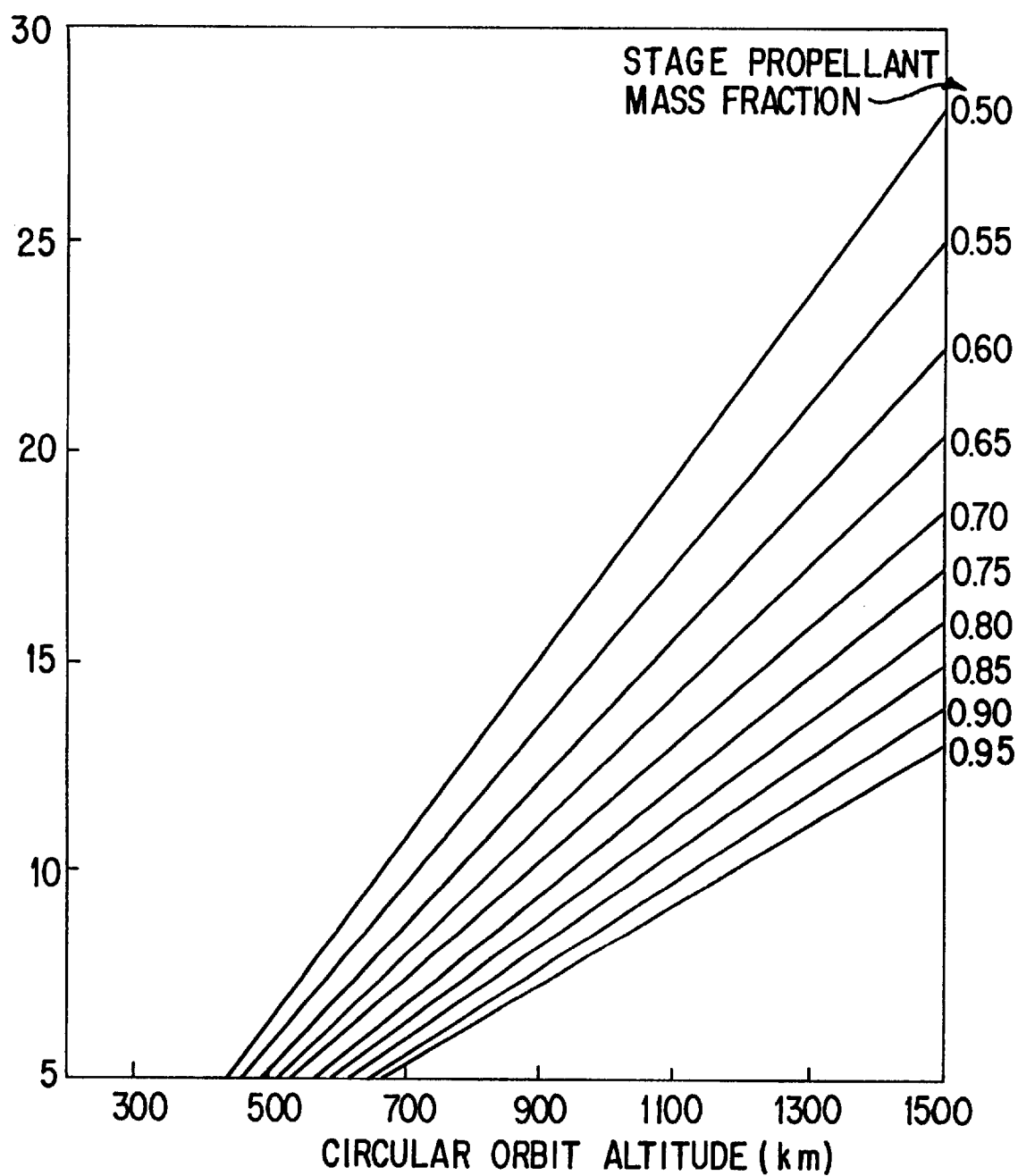
FIG. 28c shows a graph of the percentage increase in mass for a satellite using a rocket deorbit system for specific altitudes.

FIG. 28c shows the percent additional mass required in orbit to drop the perigee of a circular orbit at altitude, at, to a value of 200 km. This perigee altitude will remove any spacecraft (in the range considered) from orbit in a few revolutions. The contours of constant stage propellant mass fraction, $\Box'$, range from low values of 0.5 through reasonable values of 0.65 to 0.7, up to the values associated with the best solid motor s we can build ($\Box'$~0.93) without adding any extra hardware to the emergency stage. An effective, independent stage to provide a retro $A\Delta$ of from 50 to 325 m/s will almost certainly have a $\Box'$ of the order of 0.6 to 0.75. If the emergency stage is required to perform its own attitude determination, the stage propellant mass fraction may be as low as 0.55 or 0.50. Note that the additional mass, shown in FIG. 2, must also be lofted to orbit in the first place, to provide the mass on orbit for the originally intended service.

The stage propellant mass fraction, $\Box'$, is a key stage performance parameter that describes the ratio of the mass of propellant to the mass of the stage. That is $\Box'=m_p/(m_p+m_l)$, where $m_p$ is the mass of the propellant and $m_l$ is the mass of everything else in the stage (not including the payload or any stages above or below the stage being considered).$\Box$ Typical independent small rocket stages have values of $\Box'$ from 0.60 to 0.75. The curves of stage propellant mass fraction are shown as straight lines (a minor approximation) and are included only from 0.5 to 0.95, the extremes of reasonable design practice.

These calculations that show, beyond any reasonable doubt, that the terminator tether concept is far superior to conventional mechanisms such as drag enhancement devices or small emergency deorbit propulsion systems. The superiority is measured in terms of Area-Time product, NASA's measure of the likelihood of collision with other spacecraft in the path of the descending spent member of a constellation. Tether calculations were made using conservative assumptions that the power extractable from the ambient plasma and electrodynamic gradient is only 80% of the theoretical power available to a perfect tether crossing the magnetic field lines normally.

3. Space Tethers Systems

In addition to the use of electrodynamic Hoytethers to generate power, reboost the International Space Station and deorbit spent satellites; the present invention's ability to dependably survive in the space environment for years of decades has industrial utility in a wide variety of industrial applications. Some of these uses include: use as long antennas for broadcasting from space, using the upper atmosphere as a wind tunnel; active and passive spacecraft propulsion; support structures for thin metal film solar sails; long life tethers for use with statite nonorbiting goestationary communications systems, and advanced lunar/planetary transportation systems.

a. Broadcasting from Space

Traveling through the ionospheric plasma, a current carrying tether radiates electromagnetic waves from its entire length, and especially from its two ends. By modulating the current in the same manner that a radio station operates, it may be possible to use the waves for communications. A 20 to 100 kilometer long tether deployed from a satellite could produce ultra low frequency waves from 3 to 30 hertz; extremely low frequency waves from 30 to 300 hertz and very low frequency waves from 300 to 3,000 hertz. Broadcasting from space in these bands not only could prove to be much more efficient than Earth based transmission, but also may extend the radio frequencies that are available.

b. Using the Atmosphere as a Wind Tunnel

A tether anchored to the Space Shuttle can lower an instrumented aerodynamic model 100 to 150 kilometers into the outer atmosphere where it can be exposed to a range of conditions that are impossible to reproduce in wind tunnels: heat transfer, drag, strong air flows, and turbulence. Data gathered from these tests can be used to improve spacecraft reentry and to develop aerobraking techniques that take advantage of the atmosphere to slow a spacecraft's speed.

c. Active and Passive Spacecraft Propulsion

Space Tethers are long cables in space that are used to couple spacecraft to each other, to other masses, such as a spent booster, space station, or asteroid, and to electric, magnetic, and gravity force fields in space. The tether coupling allows the transfer of energy and momentum from one object to another, and as a result can be considered as a form of space propulsion. Tethers are now being seriously considered for use with the Space Shuttle and the Space Station for raising or lowering payloads for various scientific and engineering purposes. Rotating tethers have also been considered for transporting payloads to and from the Earth, Moon, Mars, and other bodies in the solar system. There are a number of different generic types of tethers. Each has its own advantages, and different constraints on its operation.

A stationary tether is one that connects two masses together and remains at constant length, except, of course, for deployment and retrieval. A stationary tether could drag a payload through the upper atmosphere of a planet and lower payloads to the surface of an asteroid. If the tether is conducting and is moving through electric or magnetic fields, then it can be used as a generator to provide electrical power, or as a motor to provide propulsion. If the tether and its masses are orbiting a massive body, then typically the system will be gravity gradient stabilized, with the tether pointed along the radius vector to the massive body. Thus, although the tether is stationary in the orbital reference frame, it is really rotating once per orbit in inertial space, and so is a slowly rotating bolo.

A bolo is a long rotating cable anywhere in space that is used as a "momentum-energy bank". It could be used to "catch" a payload coming from any given direction (in its plane of rotation) at any given speed (less than its maximum tip speed), and then some time later, "launch" the payload off in some other direction at some other speed. A gravity gradient stabilized bolo orbiting some planet has the property that if the tether is cut, then one-half an orbit later, the separation distance between the two masses is seven times larger than the initial separation. This can be used to deorbit the lower mass, or throw the upper mass to a rendezvous or to escape.

Figure 29:
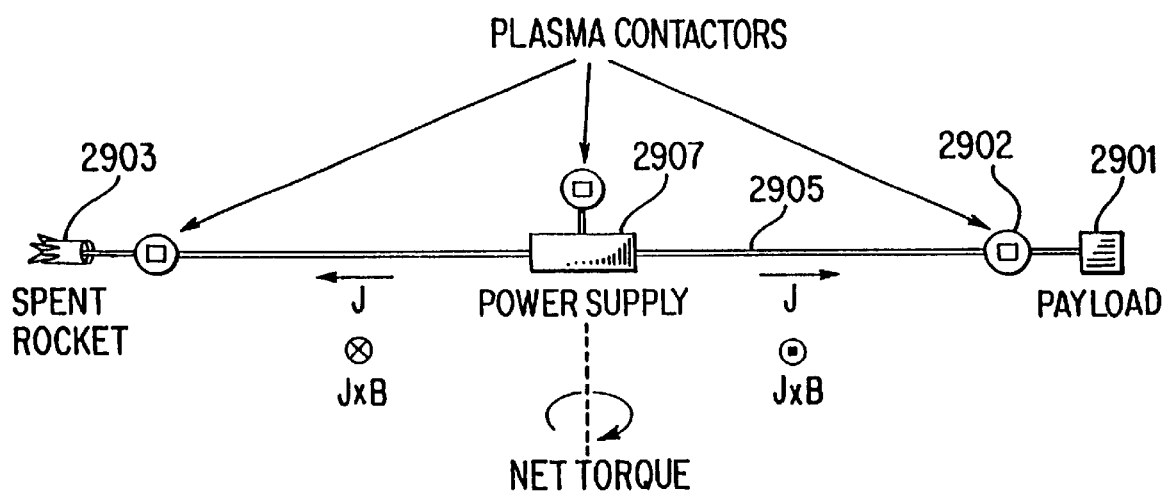
FIG. 29 shows a schematic plan of the electrodynamic bolo tether propulsion system.
Figure 30:
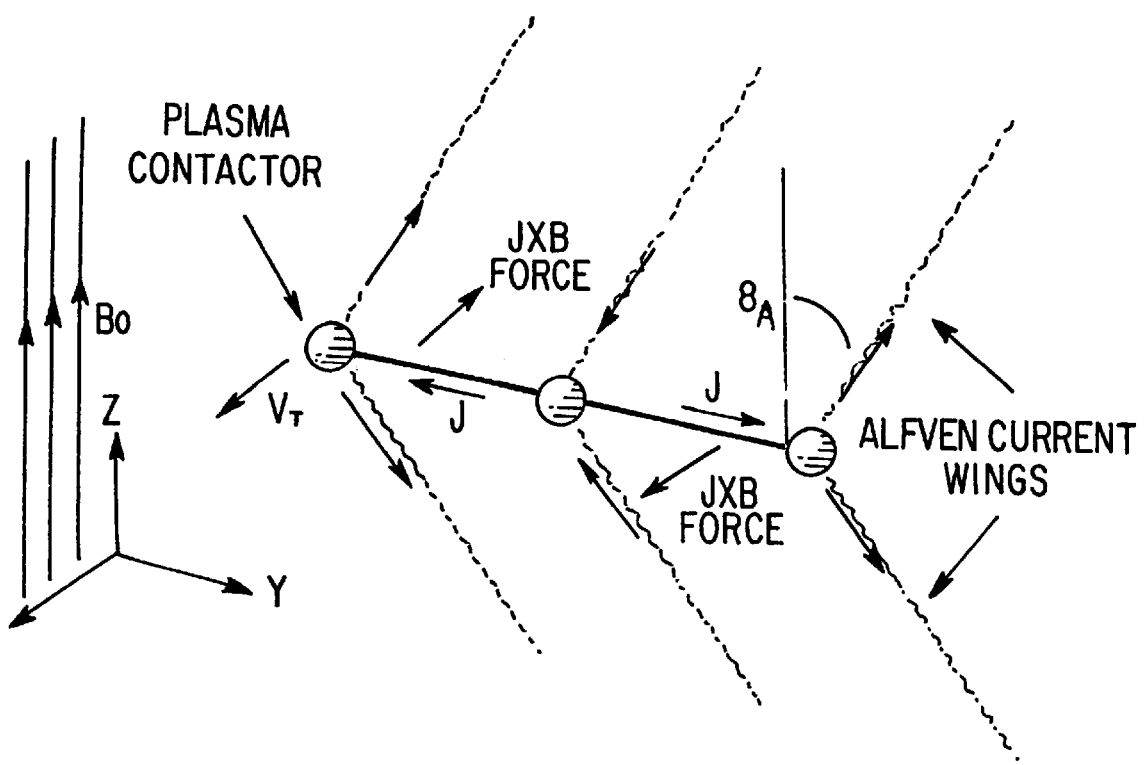
FIG. 30 shows the schematic of current flow in the electrodynamic bolo tether propulsion system.

FIG. 29 shows a space bolo tether propulsion system. In FIG. 29 A payload 2901 has been delivered to low Earth orbit by spent rocket 2903. Payload 2901 is connected by Hoytether 2905 to rocket 2903. A power supply system 2907, such as solar cells, is placed at or near the center of mass of the rocket, tether, payload system. Contactor means 2909 for connecting the conductive tether to the space plasma are placed near the power supply and at both ends of the tether. Electric current is then driven either towards bother ends of the tether or towards the supply on both sides. The schematic of current flow in the system is shown in FIG. 30. The action of these flowing currents across the geomagnetic field result in Lorentz forces on the tether. These forces result in a net torque on the tethered system. The physics of the rotational acceleration are equivalent to the physics of a homopolar generator.

The tether system can thus be "spun-up" by driving currents in the tether. Once the payload reaches the desired spin velocity, it is released at the proper time to fling it to the desired orbit. At the same time, the counterweight could be released, dropping it into a lower orbit or even a suborbital trajectory that would cause it to burn up in the atmosphere.

d. Support for Thin Metal Film Solar Sails

Present designs for solar sails use heavy plastic backing in order to allow adequate strength while deploying. The Hoytape structure can be used to support an unbacked metal film sail. The Hoytape and metal film sail could them be furled into an easily deployable ropelike cylinder.

e. Statite Communication Systems

The 'statite' (U.S. Pat. No. 5,183,225) comprises a solar sail from which a payload is suspended that flys in geostationary formation with the Earth's surface, but is not in orbit around the Earth. The statite maintains its geostationary position by balancing the force of sunlight on its solar sail against the force of the Earth's gravity. Such a geostationary platform has commercial utility for a communications system, especially at high latitudes. To operate reliably the statite system can use the failsafe long-life Hoytethers of the present invention to connect the payload to the solar sail.

f. Advanced Lunar/planetary Transportation System

A "rotovator" is a long bolo in low orbit around a planet (or moon) that is used as a giant elevator to reach down from space to lift payloads from a planet or to deposit payloads onto a planet. To reach the surface of the planet, the orbital altitude should be equal to half the length of the rotating cable. By proper adjustment of the cable rotation period to the orbital period of the center of mass of the cable (plus or minus the planetary rotation period), the relative velocity of the planetary surface and the tip of the cable can be made zero at the time of touchdown, allowing for easy payload transfer. A half-rotation later, the payload is at the top of the trajectory with a cable tip velocity that is twice the orbital velocity.

Figure 32:
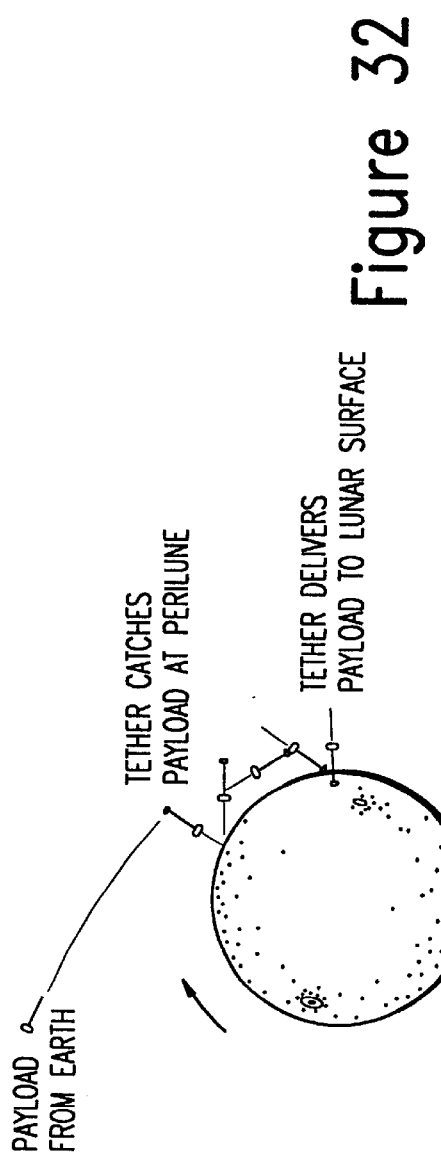
FIG. 32 shows a schematic of the Lunar rotovator.

Although present day material strengths do not allow the construction of rotovators around Earth or the major planets, they can be built for Mars, Mercury, and most moons, especially including Earth's Moon. A simple lunar rotovator is shown in FIG. 32.

The maximum tip speed of all these systems is a function of the "launcher to payload mass ratio" of the tether system and the "characteristic velocity" of the material used. The characteristic velocity of the material in a tether is given by the square root of the ratio of the design tensile strength T of the tether to the density D of the tether material.

$$u = (T\_d/D)^{1/2}$$

In practice, the design tensile strength is usually chosen to be 50% of the measured strength for metals and 25% of the measured short-term individual fiber strength for other materials. Thus, using imperfect materials with reasonable safety margins, the characteristic velocity of most metals and fibers is around 1 km/s, with optimistic predictions for graphite and improved polymers reaching three km/s. With the development of a design for a high strength-to-weight tapered Hoytether, the design tensile strength can be safely chosen to be 60% of the measured strength of the individual fibers, allowing commercially available fibers to gave characteristic velocities up to 4 km/s.

Figure 31:
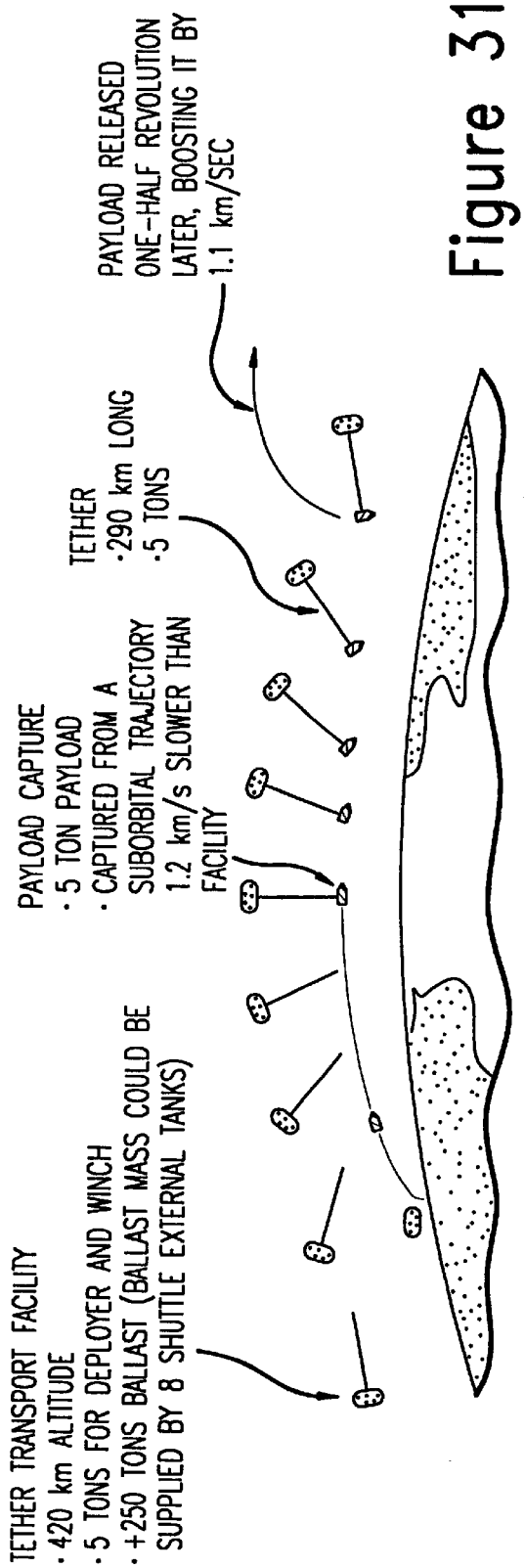
FIG. 31 shows the use of a tether to transfer momentum between a payload and an orbiting facility.

In March 1991, Joe Carroll of Tether Applications carried out a detailed design of a rotating tether transport node facility that is capable of adding or subtracting a velocity increment delta-V to a payload; one increment on attachment to the tether, and another increment upon release. This concept is shown in FIG. 31. The report focuses primarily on a 290-km barely spinning, single-arm bolo extending from a massive central facility in a 400 km circular Earth orbit. The facility can capture objects at velocities 1.2 km/s less than orbit velocity, in trajectories with apogees as low as 130 km. It can then retrieve them, release them into orbits similar to the facility orbit, or boost them into orbits with perigees near 600 km and velocities 1.1 km/s above circular orbit velocity. To prevent facility orbit decay, momentum balance would be obtained from return traffic and/or high specific impulse electric propulsion between captures.

g. LEO-Lunar Surface Tether Transport System

Figure 33A:
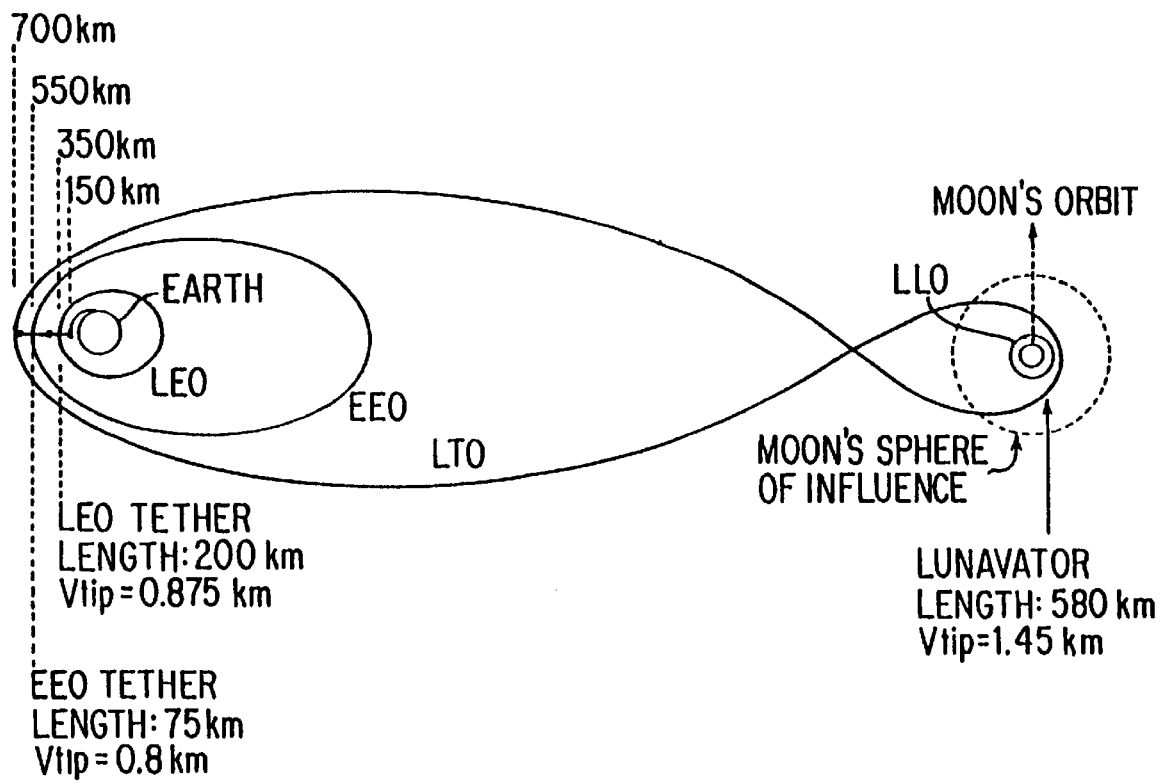
FIGS. 33a and 33b shows a diagram of the LEO—lunar surface tether transport system taught by the present invention.
Figure 33B:
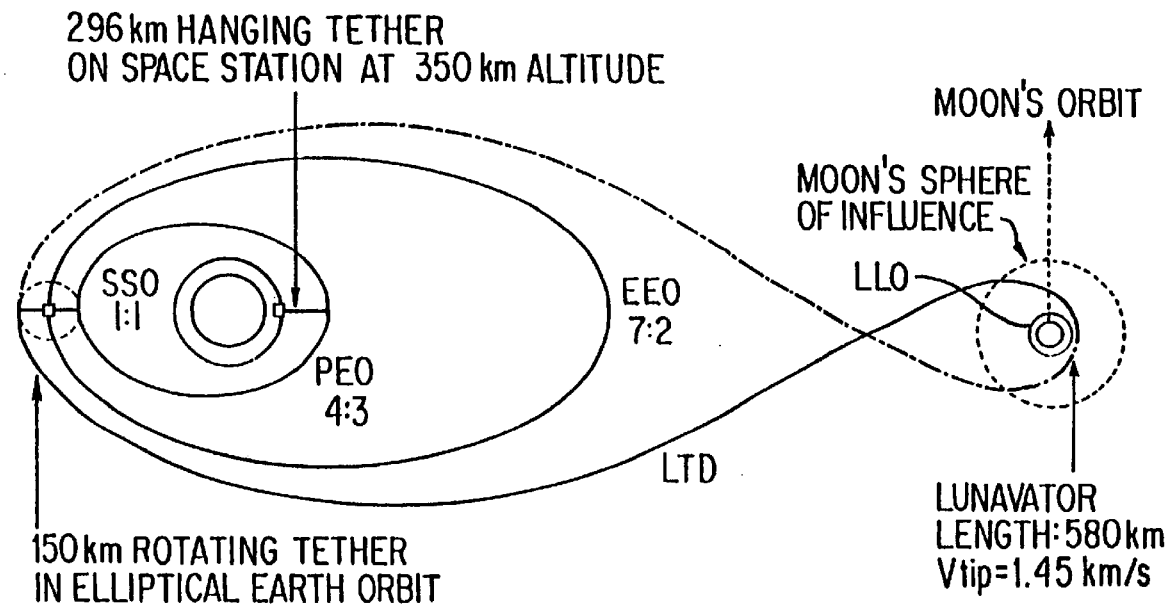

As shown in FIGS. 33a and 33b, systems composed of rotating tethers may provide a means of exchanging payloads between low Earth orbit and lunar bases without requiring the use of propellant. By breaking the total ΔV required to insert a payload into a lunar transfer orbit up into several stages, the total tether and system mass required can be minimized. Such a staged tether transport systems can transport payloads from suborbital Earth trajectories to the lunar surface and back.

Nomenclature a semimajor axis e ellipse eccentricity

E orbital energy

L tether arm length r radius $r_P$ perigee radius
V velocity
☐ phase angle
☐ flight path angle
$\mu_e$ Earth's gravitational parameter=$GM_e$
$\mu_m$ Moon's gravitational parameter=$GM_m$
in this document, they are summarized below:

To help the reader keep track of the numerous TLA's (three-letter-acronyms) used:
IPO Initial Payload Orbit
LEO Low-Earth Orbit
EEO Elliptical Earth Orbit
PEO Payload Elliptical Orbit
LLO Low-Lunar Orbit
LTO Lunar Transfer Orbit
RLV Reusable Launch Vehicle
SOI Gravitational Sphere of Influence
TTF Tether Transport Facility In his paper "Tether Transport from LEO to the lunar Surface," Forward showed that it is conceptually possible to construct a system of rotating tethers in Low-Earth Orbit (LEO), Elliptical Earth Orbit (EEO), and Low-Lunar Orbit (LLO) which can lift payloads from LEO to the lunar surface while simultaneously dropping lunar resources down to LEO, without requiring any propellant. In reality, such a LEO-Lunar transport system can require some propellant for orbital maintenance of the tether facilities and for performing modifications to payload orbital-trajectories. In this section, we discuss the design of the tether transport system and develop a method for planning orbital parameters for the system that will minimize the propellant mass required for payload propulsion.

While it is possible to design a single tether in LEO to throw payloads to the moon, the large $\Delta V$ requirements make a single tether for this task very massive. However, the scaling of tether mass with $\Delta V$ makes it possible to greatly reduce the necessary tether mass by splitting the $\Delta V$ operations up between two or more tethers.

The mass of a tapered rotating tether with tip speed $V_t$ depends upon ratio of the tip speed to the tether material's characteristic tip speed:

$$V_c = \sqrt{\frac{2T}{Fd}}, \quad (1)$$

where T is the tensile strength of the material, F is the design safety factor, and d is the material density. For Spectra 2000, the best fiber presently available in quantity, T=3.25 GPa, d=0.97 g/cc, and thus $V_c$=1.83 km/s for a safety factor of F=2. A tapered tether capable of giving a payload with mass $M_p$ a velocity increment $\Delta V$ has a mass $M_T$ given by[i]

$$M_T = M_p \sqrt{\pi} \frac{\Delta V}{V_c} e^{\frac{\Delta V^2}{V_c^2}} \mathrm{erf}\left\{\frac{\Delta V}{V_c}\right\}, \quad (2)$$

where erf{x} is the error function of x. The mass of the tether thus depends upon the exponential of the square of the ratio $\Delta V/V_c$. As a result, if the $\Delta V$ operation can be split up into several operations performed by two or more tethers, the sum of the staged tether masses can be significantly less than the mass of a single tether designed for the entire $\Delta V$ operation.

A spacecraft in LEO orbit requires an injection speed of approximately 11 km/s to reach the moon. For a tether in a circular orbit at 300 km altitude, a tip speed of approximately 3.3 km/s is required to throw a payload into a lunar transfer orbit (LTO). To accomplish this $\Delta V$ with Spectra 2000 at a safety factor of 2 would require a tether massing approximately 80 times the payload mass. If, however, this $\Delta V$ operation is instead accomplished using two rotating tethers, the total tether mass required can be greatly reduced. For instance, a tether in 300 km circular orbit could be used to impart a 1.1 km/s boost to a payload, throwing it into a temporary elliptical orbit. The payload could then be caught and boosted by a second rotating tether facility. If that facility is moving 1.1 km/s faster than the payload, then if its tether has a tip speed of 1.1 km/s it could capture the payload with zero relative velocity on its downward swing and throw the payload on its upward swing, providing it a total $\Delta V$ of 2.2 km/s for that second stage. The total $\Delta V$ would be the required 3.3 km/s, and the staged tether system would require a total tether mass of only two times the payload mass. Consequently, until advances in the state of the art of high-strength fibers increases the strength-per-weight of tethers substantially, a multi-stage tether system will have great advantages for reducing the required tether mass.

While staging the tether transport system can significantly reduce the tether mass required, it adds the complication of the necessity to carefully select the tether lengths, rotation rates, and orbital parameters to enable payloads to be passed from the LEO tether to the EEO tether and tossed into a LTO that will intercept the upper tip of the Lunavator.

Whereas Forward proposed that the LEO stage would be in a circular orbit, we will choose a slightly elliptical orbit to reduce the required facility mass, as will be explained below. This first stage will, on its downward swing, catch a payload launched into a suborbital trajectory. One orbit later, it will transfer the payload to the second stage. The second stage is a tether facility in a higher elliptical Earth orbit (EEO), which acquires the payload, carries it for one orbit, and then throws it into a lunar transfer orbit (LTO). The length and spin of the two tethers are chosen so that the tips have zero relative velocity when they rendezvous, facilitating transfer of the payload. When the payload reaches the moon, a Lunavator in a circular low-lunar orbit catches the payload and swings it down to the surface. The Lunavator's length, orbit, and spin are chosen so that the tip touches down on the lunar surface with zero velocity relative to the surface (like a spoke on a bicycle wheel). Thus, when the Lunavator's tip touches down, the payload can be delivered to a lunar base.

Because the laws of conservation must be obeyed, the energy and momentum gained by the payload on the way to the moon must come out of the orbital energy and momentum of the tether facilities in Earth orbit. If the tether system is also used slack payloads up from the lunar surface and drop them down to LEO, and if the return payload mass is equal to the outbound payload mass, the energy and momentum of the payloads falling down into Earth's gravity well can restore the orbital energy of the tether facilities. These return payloads could be oxygen, aluminum, or other products of lunar factories—or they could just be bags of lunar dirt. The total energy required to transport payloads to the moon can thus be reduced to the energy required to launch them into a suborbital Earth trajectory.

During periods when there is not return traffic to balance the upward mass flow, the orbital momentum and energy of the system can be replenished using high specific impulse propulsion such as ion or Hall thrusters. The propellant savings payoff will not be as high as when there is return traffic, but the tether system will enable payloads to be transferred to the moon with the fuel economy of electric propulsion without requiring the multi-month transfer times usually associated with high-Isp propulsion.

The following analysis is made to determine the feasibility of designing a staged tether system to transport payloads between sub-LEO trajectories and the lunar surface. Accordingly, the initial analyses will not pursue a full-up orbital mechanics calculation including all of the possible perturbative effects. Rather, the analysis will use several simplifying assumptions described below; if the results of this initial analysis indicate that this design is worthy of further development, improved designs of the orbital parameters for the tether transport system can be developed using the same methodology but using improved models for the orbital mechanics.

Simplifying Assumptions:

1. Elliptical Low-Earth Orbits. We ignore the perturbative effects of the sun, the moon, and other bodies on the orbits of the LEO and EEO tethers, and assume that their orbits are described by Keplerian orbital mechanics (i.e.—their orbits are ellipses)
2. Ignore Nodal Regression. The oblateness of the Earth causes nodal regression (rotation of the orbital plane) of satellites in non-equatorial orbits. The regression rate depends upon the inclination and altitude of the orbit, and thus will be different for the LEO and EEO tether facilities (and, to a much smaller extent, the moon). For the first analysis we will assume that the LEO and EEO tethers orbit in the Earth's equatorial plane and thus do not suffer nodal regression. Payloads could be launched to this system from a Sea-Launch platform on the equator. In addition, the orbit of the moon is inclined by an average of 5°8' to the ecliptic, while the Earth's axis of rotation is inclined to the ecliptic by 23°27'. Thus even an equatorial tether transport system will require either careful scheduling or some propulsion capability on the payload to permit intercept with the moon.
3. Large Tether Ballast Mass. The transfer of momentum from the tether transfer terminal to a payload will significantly alter the orbit of the tether terminal. For this analysis, we assume that the payload mass is small compared to the tether ballast mass so that changes in the terminal orbit will be negligible.
4. Circular Lunar Orbit. For this analysis, we ignore the slight eccentricity of the lunar orbit (0.0549), and assume that the moon travels in a circle with radius of 384,400 km with a velocity of 1.018 km/sec.
5. Use Patched Conic Approximation for LTO. We will utilize the methods of 2-body orbital mechanics by assuming that a payload in a Lunar Transfer Orbit moves under the influence of Earth's gravity alone until it enters the gravitational "sphere of influence" (SOI) of the Moon. Thus, the payload trajectory from LEO to the SOI is described by a conic section. Inside the lunar SOI, the gravitational effects of the Earth are assumed to affect the payload and Moon orbits equally, and so the payload is assumed to move relative to the moon under the influence of only the gravitational field of the Moon; the payload trajectory in the Moon's reference frame is thus hyperbolic. In addition, we assume that the lunar sphere of influence is perfectly spherical with a radius of 66,300 km.

Conceptual Design of a Suborbital Trajectory to Lunar Surface Transport System LEO and EEO Tether Facility Orbits The LEO tether facility has a slightly elliptical orbit with semimajor axis $a_{LEO}$ and eccentricity $e_{LEO}$. It has a tether arm-length of $L_{LEO}$, and rotates with angular velocity $\Omega_{LEO}$. The EEO tether facility has an arm-length of $L_{EEO}$, rotates with angular velocity $\Omega_{EEO}$, and orbits in an elliptical trajectory with semimajor axis $a_{EEO}$ and perigee altitude $r_{p,EEO}$.

The LEO facility should be able to pick up a payload in a suborbital trajectory and toss it into an intermediate elliptical orbit (PEO-payload elliptical orbit). Later, the EEO tether will capture the payload at its perigee and toss into a lunar transfer orbit.

For the LEO and EEO transfer facilities, and the PEO payload orbit, we will use the following relationships between the orbital parameters:

$$\text{LEO TTF perigee velocity: } V_{p,LEO} = \sqrt{\mu_e\left(\frac{2}{r_{p,LEO}} - \frac{1}{a_{LEO}}\right)} = \sqrt{\frac{\mu_e}{a_{LEO}}\left(\frac{1+e_{LEO}}{1-e_{LEO}}\right)}, \quad (3)$$

$$\text{LEO Facility orbital period: } P_{LEO} = 2\pi\sqrt{\frac{a_{LEO}^3}{\mu_e}}, \quad (4)$$

$$\text{LEO Facility Perigee: } r_{p,LEO} = a_{LEO}(1-e_{LEO}), \quad (5)$$

$$\text{EEO Facility Perigee: } r_{p,EEO} = a_{EEO}(1-e_{EEO}), \quad (6)$$

$$\text{EEO Facility orbital period: } P_{EEO} = 2\pi\sqrt{\frac{a_{EEO}^3}{\mu_e}}, \quad (7)$$

$$\text{EEO Facility perigee velocity: } V_{p,EEO} = \sqrt{\mu\left(\frac{2}{r_{p,EEO}} - \frac{1}{a_{EEO}}\right)} = \sqrt{\frac{\mu_e}{a_{EEO}}\left(\frac{1+e_{EEO}}{1-e_{EEO}}\right)}, \quad (8)$$

$$\text{PEO orbital period: } P_{PEO} = 2\pi\sqrt{\frac{a_{PEO}^3}{\mu_e}}, \quad (9)$$

$$\text{PEO orbital energy: } E_{PEO} = \frac{V_{p,PEO}^2}{2} - \frac{\mu_e}{r_{p,PEO}} = -\frac{\mu_e}{2a_{PEO}}, \quad (10)$$

wehre $\mu_e = GM_e$ is the Earth's gravitational parameter.

To achieve transfer of a payload from the first stage to the second stage, the tether tips must be at the same radius when both are at perigee with the LEO tether at the tip of its spin and the EEO tether at the bottom of its spin. This radius is the PEO perigee radius:

$$r_{p,PEO} = r_{tip,LEO} = r_{p,LEO} + L_{LEO} = r_{tip,EEO} = r_{p,EEO} - L_{EEO} \quad (11)$$

In addition, the velocities of the tips at perigee must be equal so that the tips and payload rendezvous with zero relative velocity:

$$V_{tip,LEO} = V_{LEO} + \Omega_{LEO}L_{LEO} = V_{tip,EEO} = V_{p,EEO} - \Omega_{EEO}L_{EEO} \quad (12)$$

We must have the orbits of the LEO facility, the EEO facility be resonant so that transfers opportunities occur periodically. Additionally, we desire that the payload orbit be resonant with these orbits so that if a payload is released by the LEO tether and is not successfully caught by the EEO tether, the EEO tether will have additional opportunities to rendezvous with the payload several orbits later. Consequently, we specify that the orbital period of the EEO TTF is N times that of the LEO TTF, and that the orbital period of the payload in PEO is M times that of the LEO TTF:

$$P_{EEO} = NP_{LEO} \quad (13a)$$

$$P_{PEO} = MP_{LEO} \quad (13b)$$

Note that M and N need not be round integers, but should be rational numbers, preferably with small numerators and denominators to permit frequent rendezvous.

From Eqn. (13) and Eqns. (7&9):

$$a_{EOE} = N^{2/3} r_{LEO}. \quad (14a)$$

$$a_{PEO} = M^{2/3} r_{LEO}. \quad (14b)$$

From Eqns. (11) and (13), using relations in Eqns. (3–8), we obtain $$e_{EEO} = 1 - \frac{r_{p,LEO} + L_{LEO} + L_{EEO}}{N^{2/3} r_{LEO}} \quad (15)$$

From Eqn. (10) and (13), we obtain a relation between $L_{LEO}$ and $\square_{LEO}$ that permits the LEO and PEO orbits to be harmonic:

$$\omega_{LEO} = \frac{\sqrt{\mu_e \left( \frac{2}{r_{p,LEO} + L_{LEO}} - \frac{1}{M^{2/3} a_{LEO}} \right)} - V_{p,LEO}}{L_{LEO}} \quad (16)$$

From Eqn. (11) and (14), we find the EEO tether angular velocity:

$$\omega_{EEO} = \quad (17)$$

$$\frac{1}{L_{EEO}} \left[ \sqrt{\frac{\mu_e}{a_{EEO}} \left( \frac{1+e_{EEO}}{1-e_{EEO}} \right)} - \sqrt{\frac{\mu_e}{a_{LEO}} \left( \frac{1+e_{LEO}}{1-e_{LEO}} \right)} - \omega_{LEO} L_{LEO} \right]$$

Thus, by speeding LEO facility perigee radius, velocity and tether length, the EEO tether length $L_{EEO}$, and the orbital harmonic ratios N and M, we can obtain the necessary LEO tether rotation rate $\square_{LEO}$, orbital elements $e_{EEO}$ and $a_{EEO}$ and rotation rate $\square_{EEO}$ for the EEO tether. From these quantities we can calculate the orbital parameters of the PEO and lunar transfer trajectories.

Lunar Transfer Orbit

After the payload is captured by the EEO tether, the tether length can be adjusted to change the tether rotation rate (via conservation of angular momentum) so that the payload will be at the top of the tether when the tether returns to perigee. The payload is then injected into a lunar transfer orbit by releasing it from the end of the EEO tether at this time. Thus, the LTO perigee condition for the payload are:

$$V_{p,LTO} = V_{p,EEO} + V_{tip,EEO} = \sqrt{\frac{\mu_e}{a_{EEO}} \left( \frac{1+e_{EEO}}{1-e_{EEO}} \right)} + \omega_{EEO} L_{EEO} \quad (18)$$

With these parameters obtained from our original specification of $r_{LEO}$, $L_{LEO}$, $L_{EEO}$, N, and M, we can then calculate patched-conic orbits by specifying two additional parameters: the injection flight path angle $\square_0$ and the angle $\square_1$, which specifies the point where the spacecraft enters the lunar sphere of influence. If the tether is released exactly at EEO tether perigee and with the tether exactly vertical, then the flight path angle at injection is $\square_0 = 0$.

We calculate the patched-conic LTO following the procedure of Bate,[ii] and find the perilune radius and velocity that will be obtained with the specified parameters. Using an iterative process, we have found a solution which matches the perilune radius and velocity with the radius and velocity of the upper tip of a Moravec Lunavator. The design parameters for this LEO-Lunar Surface Tether Transport system are:

Suborbital Launch Trajectory
A re-usable launch vehicle (RLV) lifts the payload to an altitude of 150 km, with a velocity of 7.38 km/s, where it is delivered to the tip of the LEO tether on its downward swing.

LEO Tether
Elliptical orbit with perigee altitude $h_{LEO} = 350$ km, orbit eccentricity $e_{LEO} 0.15$.
Tether arm length $L_{LEO} = 200$ km.
Tether angular velocity $\square_{LEO} = 0.0043776$.
Tether tip speed $V_{T,LEO} = 0.875$ km/s.
Centripetal acceleration on payload=0.4 g.
Throws payload into elliptical orbit with period $P_{PEO} = 2 P_{LEO}$.
Single-arm tether mass (Spectra 2000, safety factor 2.4) $M_{tether} \geq 0.66 M_{payload}$.

EEO Tether
Elliptical orbit, semimajor radius $a_{EEO} = 26138$ km, eccentricity $e_{EEO} = 0.732$.
Period $P_{EEO} = 6 P_{LEO}$.
Tether arm length $L_{LEO} = 75$ km.
Tether angular velocity $\square_{EEO} = 0.01067$.
Tether tip speed $V_{T,EEO} = 0.8$ km/s.
Centripital acceleration on payload=0.86 g.
Single-arm tether mass (Spectra 2000, safety factor 2.4) $M_{tether} \geq 0.54 M_{payload}$.

LTO
Perigee altitude $h_{p,LTO} = 700$ km.
Perigee velocity 10.73 km/s.
Angle of incidence with Lunar sphere of influence $\square_1 = 19.314°$.
Hyperbolic orbit, $a_{LTO} = -161,119$ km, $e_{LTO} = 1.044$.
Perilune radius 2897.4 km.
Perilune velocity 2.905 km/s.
Time-of-Flight to lunar sphere of influence ~30 hr.

Lunavator
Circular orbit, altitude=arm length=1/3 $R_m = 579.53$ km.
Orbital velocity=1.452 km/s.
Tip position at capture=2897.7 km.
Tip total velocity at capture=2.904 km/s.
Single-arm tether mass (Spectra 2000, safety factor 1.75) $M_{tether} \geq 1.6 M_{payload}$.

The errors in perilune radius and velocity are less than 1 km and 1 m/s, respectively, which are well below the errors associated with the patched-conic approximation.

Note that the EEO orbit has a period 6 times that of the LEO orbit, compared to the 4× originally proposed by Forward. We found that when tether spin rates are matched to enable transfers at perigee, an EEO orbit with period 4 times that of the LEO orbit would not have sufficient perigee velocity to throw a payload into LTO. A 5:1 ratio is sufficient to throw to an elliptical LTO trajectory, but this trajectory will result in a perilune velocity too slow to match with the Lunavator rotation. A ratio of 6:1, which results in a hyperbolic LTO trajectory, provides sufficient $\Delta V$ to rendezvous with the Lunavator.

Note that both of the Earth-orbit tethers have masses less than their payload capacity. Thus, the LEO tether could be used to place the EEO tether in orbit, and both tethers could be used to capture replacement tethers in orbit.

Facility Mass
In previous studies of tether transfer facilities, the facility orbit was chosen to be circular. As mentioned above, in this sub-LEO to Lunar surface transport system design the LEO facility orbit was chosen to be elliptical rather than circular. This choice was driven by the desire to minimize the facility mass required to keep the tether facility in orbit after a boost operation. The LEO tether became the payload by a total $\Delta V_{payload}=2V_{tip}$ of the use total momentum must be conserved, the LEO facility will be decelerated by approximately $$\Delta V \cong 2V_{tip} \frac{1}{\chi_{LEO}}, \qquad (20)$$

where $\square_{LEO}$ is the ratio of LEO facility mass to payload mass and $V_{tip}$ is the tether tip velocity. Therefore, if the LEO facility began in a circular orbit, immediately after the LEO facility releases the payload the facility would be placed into a new orbit with an apogee roughly equal to its original circular orbit radius and a perigee that depends upon the mass ratio. For an orbit altitude of 400 km and a tip speed of 1 km/s, a mass ratio of $\square_{LEO}>75$ is required to keep the facility perigee above 300 km of altitude, and the tether must be retracted rapidly to prevent it from burning up in the atmosphere. While it may be feasible to use on-orbit waste (spent booster rockets, main shuttle tanks, ISS waste materials) to provide this ballast mass, this large mass requirement appears to make a circular orbit impractical for the LEO facility. However, if the LEO orbit is chosen to have a significant eccentricity, its perigee velocity will be significantly above the circular orbit velocity at that altitude. Thus, with a sufficient mass ratio $\square_{LEO}$, the post-boost facility orbit will have essentially the same perigee altitude, and will not be de-orbited. For the design given above, a facility mass of 4 times the payload mass would be adequate to keep the perigee at the same altitude.

Because the EEO tether facility is in a highly elliptical orbit, its total mass can also be low while still maintaining the perigee altitude. In fact, a EEO facility mass of approximately 2 times the payload mass would have an interesting benefit in that after the boost operation, the facility would be placed into an orbit nearly the same as the payload orbit (PEO), where it could periodically rendezvous with the tip of the LEO tether. The EEO tether could therefore be captured, serviced, or refueled by the LEO tether facility.

Note, however, that with such low mass ratios, Eqns. (3)–(19) must be modified to account for the finite mass ratio effects.

The mass ratio required for the Lunavator facility is higher, but still within the limits of reason. The required facility mass is driven not by the need to keep the facility from deobiting into the moon, but rather to keep the payload from pulling the facility too far away from the moon after capture. A Lunavator rotates in the same direction if it orbits the moon; consequently, when it captures the payload sent from the Earth-orbit tethers, the payload is travelling faster than the Lunavator center of mass. After payload capture the facility and payload center of mass will be in an elliptical orbit with radius always equal to or greater than the facility's initial orbit radius. A facility mass of 20 times the payload mass will keep the post-capture orbit eccentricity below 0.1.

The present inventors' therefore believe that it is within the present state of the art to construct a staged tether system using reasonable tether lengths, masses, and rotation speeds that is capable of exchanging payloads between suborbital Earth trajectories and the lunar surface. Using several simplifying assumptions, including that of coplanar orbits, circular lunar orbit, neglecting nodal regression, and the patched-conic approximation for the lunar transfer orbit, we have developed a preliminary design for a tether transport systems that can pick up payloads from a reusable launch vehicle in a suborbital trajectory and transfer them to the lunar surface. By returning an equal mass of lunar material to Earth through the same transportation system, the orbital energy and momentum of the system can be conserved, allowing payloads to be transported from low Earth orbit to the moon using little or no propellant. Using currently available materials, such a system could be built with a total tether mass of less than three times the payload mass, and total system masses of less than 30 times the payload mass.

It is essential for this concept that equal amounts of mass flow in both directions, so that a tether picks up as much mass as it releases. First, this means the Earth tether facility masses can be order of magnitude less than the mass estimates in the Carroll studies, which assumed the 5 ton payloads would be added or subtracted without exchanging a compensating mass. With equal mass flow, the Earth tether transport facilities can mass as low as 30 tons. Second, with equal mass flow, the system would be self-powered. Bags of lunar dirt moving down the tether system into the Earth gravity well would be the "fuel" needed to move payloads from LEO to the surface of the Moon.

Since 1 kg mass and from the lunar surface to LFO general 27 MJ of energy, a small excess of lunar dirt would provide makeup energy to compensate for air drag, reel friction, and stretching of the tether.

g. The Cable Catapult

Figure 34:
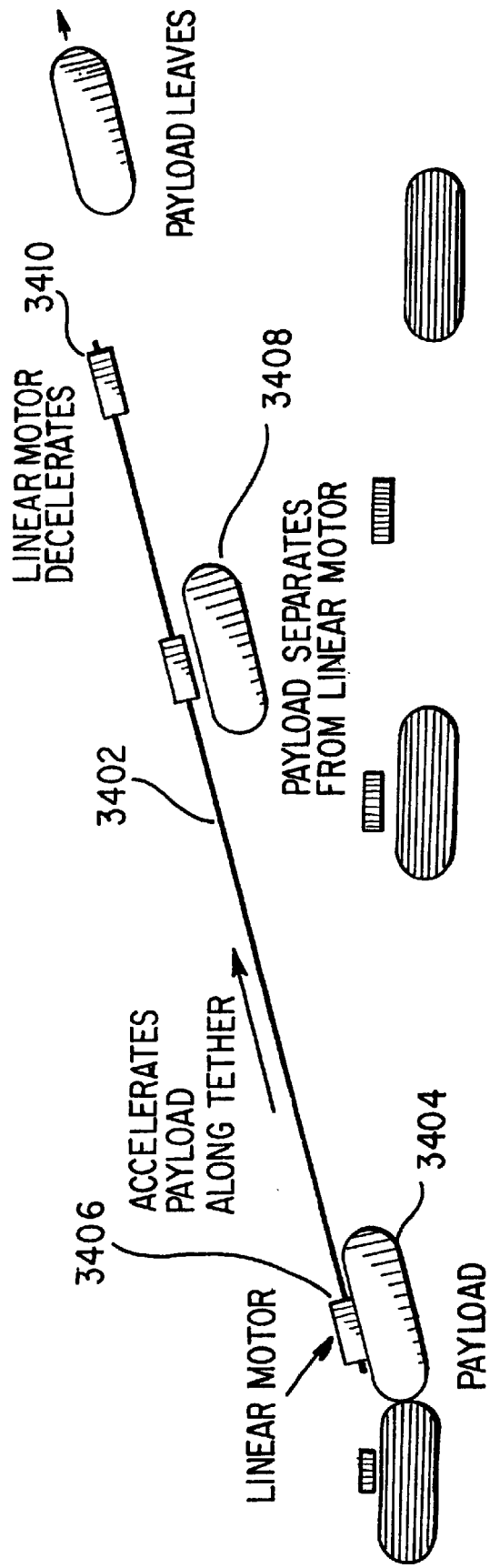
FIG. 34 shows the tether cable catapult system.

In this system, shown in FIG. 34, a very long Hoytether 3402 is used as a launch rail. A long tether is extended in space and pointed towards the target. The payload 3404 is attached to a linear motor 3406 powered by an external electrical source, not shown. The linear motor "climbs" the tether, as shown at 3408, accelerating the payload up to launch speed. At the launch point, the payload is released to travel on to the destination while the linear motor is decelerated to a halt on a shorter section of tether 3410.

This concept has the potential to enable launch velocities 30× the characteristic speed of the tether material. With advanced materials, launch velocities of 30–100 km/s may be possible, enabling interplanetary travel with trip times of months rather than years.

The present invention is discussed in this disclosure in terms of its space applications. It should be understood, however, that the Hoytether is useful in any application where the tether must be operated without failure for long periods of time in hostile environments and/or safely when the load is near the ultimate strength of the tether material. The invention, therefore, should be limited not by this description, but only by the appended claims and their equivalents.

What is claimed is:

1. A tether comprising an odd number of primary lines at least equal to five primary lines and a plurality of secondary lines, each said secondary line being interconnected to alternate primary lines by knodess slipless interconnections.

2. A tether as in claim 1 wherein the primary and secondary lines are covered with an atomic oxygen resistant polymer coating.

3. A tether as in claim 1 wherein the primary and secondary lines are fabricated of bi-component yarns having the outer layer of the line formed from an atomic oxygen resistant material.

* * * * *